United States Patent
Furukawa et al.

(10) Patent No.: US 10,935,703 B2
(45) Date of Patent: Mar. 2, 2021

(54) OPTICAL MEMBER, LIGHT-EMITTING DEVICE, DISPLAY, AND ILLUMINATOR

(71) Applicant: Sony Corporation, Tokyo (JP)

(72) Inventors: Norimasa Furukawa, Tokyo (JP); Hiroki Asakawa, Kanagawa (JP)

(73) Assignee: Sony Corporation

( * ) Notice: Subject to any disclaimer, the term of this patent is extended or adjusted under 35 U.S.C. 154(b) by 0 days.

(21) Appl. No.: 16/615,989

(22) PCT Filed: Mar. 29, 2018

(86) PCT No.: PCT/JP2018/013135
§ 371 (c)(1),
(2) Date: Nov. 22, 2019

(87) PCT Pub. No.: WO2018/220978
PCT Pub. Date: Dec. 6, 2018

(65) Prior Publication Data
US 2020/0081164 A1 Mar. 12, 2020

(30) Foreign Application Priority Data
May 31, 2017 (JP) .............................. JP2017-108337

(51) Int. Cl.
*G02B 5/02* (2006.01)
*G02F 1/1335* (2006.01)
*G02B 5/04* (2006.01)

(52) U.S. Cl.
CPC ............. *G02B 5/0284* (2013.01); *G02B 5/04* (2013.01); *G02B 5/045* (2013.01); *G02F 1/133504* (2013.01)

(58) Field of Classification Search
CPC ........ G02B 5/0284; G02B 5/04; G02B 5/045; G02F 1/133504
See application file for complete search history.

(56) References Cited

U.S. PATENT DOCUMENTS

2016/0054507 A1* 2/2016 Hirayama ............ G02B 6/0091
349/65

FOREIGN PATENT DOCUMENTS

| JP | 2000306409 A | 11/2000 |
|----|--------------|---------|
| JP | 2004069879 A | 3/2004 |

(Continued)

OTHER PUBLICATIONS

Luminit; Light Shaping Diffuser Overview [searched on Apr. 21, 2017], Internet <URL: http://www.luminitco.com/products/light-shaping-diffusers>; 3 pgs.

(Continued)

*Primary Examiner* — Nathanael R Briggs
(74) *Attorney, Agent, or Firm* — Lerner, David, Littenberg, Krumholz & Mentlik, LLP

(57) ABSTRACT

There is provided an optical member that achieves a desired light distribution characteristic while having a simple configuration. The optical member includes a first transparent optical sheet and a second transparent optical sheet that are superimposed on each other in a first axial direction. The first transparent optical sheet includes a structure in which a first region and a second region are alternately disposed in a second axial direction. The second transparent optical sheet includes a structure in which a third region and a fourth region are alternately disposed in a third axial direction. An angle formed by the third axial direction with respect to the second axial direction is equal to or greater than 0° and less than 45°.

12 Claims, 19 Drawing Sheets

(56) References Cited

FOREIGN PATENT DOCUMENTS

| JP | 2017068248 A | 4/2017 |
|---|---|---|
| WO | 2014157461 A1 | 10/2014 |
| WO | 2017057394 A1 | 4/2017 |

OTHER PUBLICATIONS

International Search Report corresponding to PCT/JP2018/013135, dated May 29, 2018, 3 pgs.

* cited by examiner

[ FIG. 1 ]
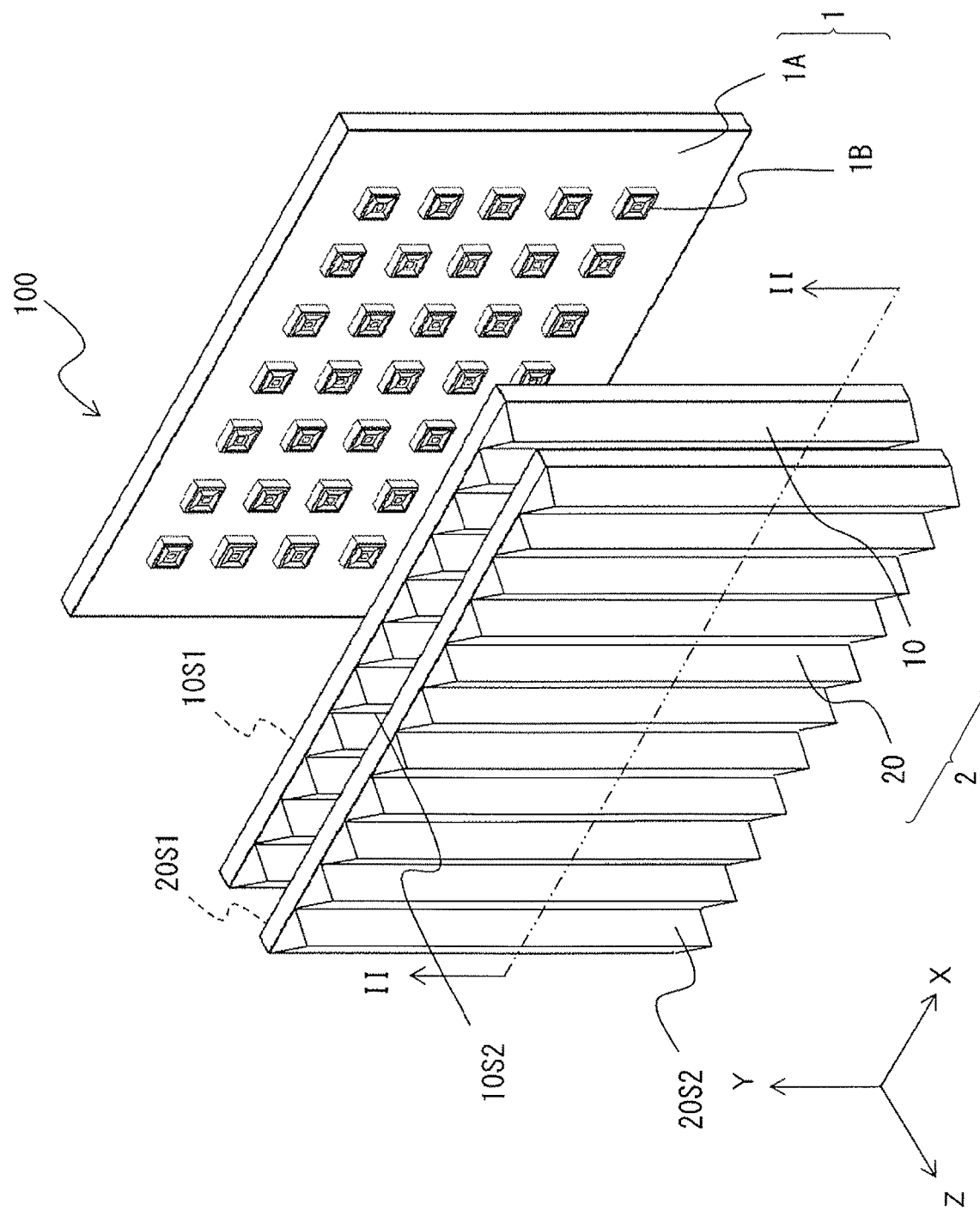

[FIG. 2]
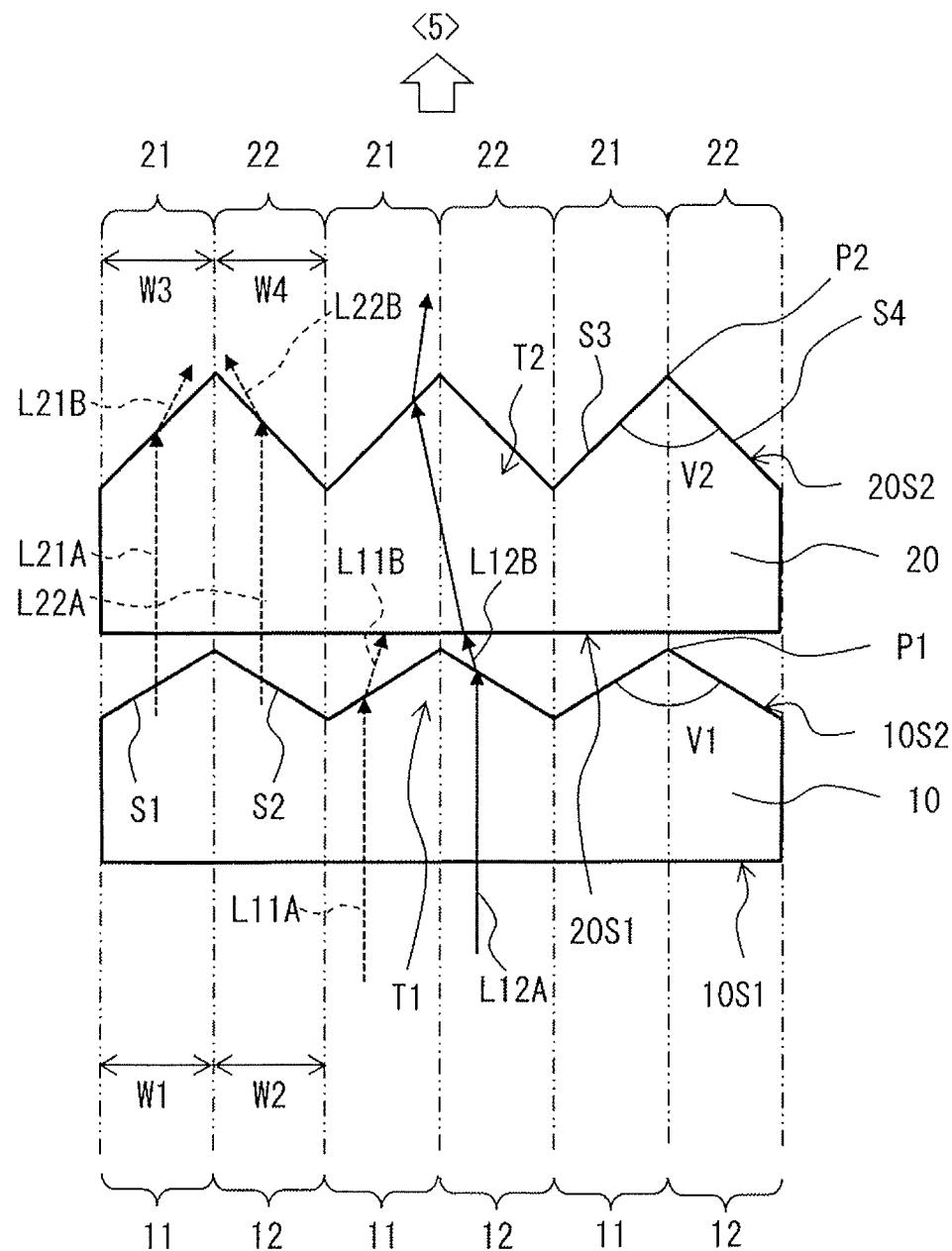

[ FIG. 3A ]
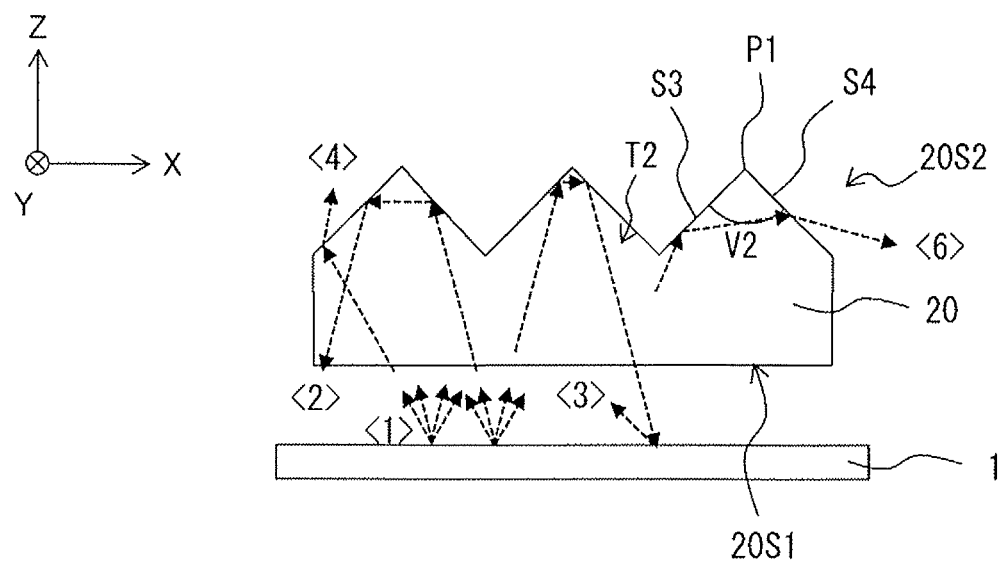
[ FIG. 3B ]
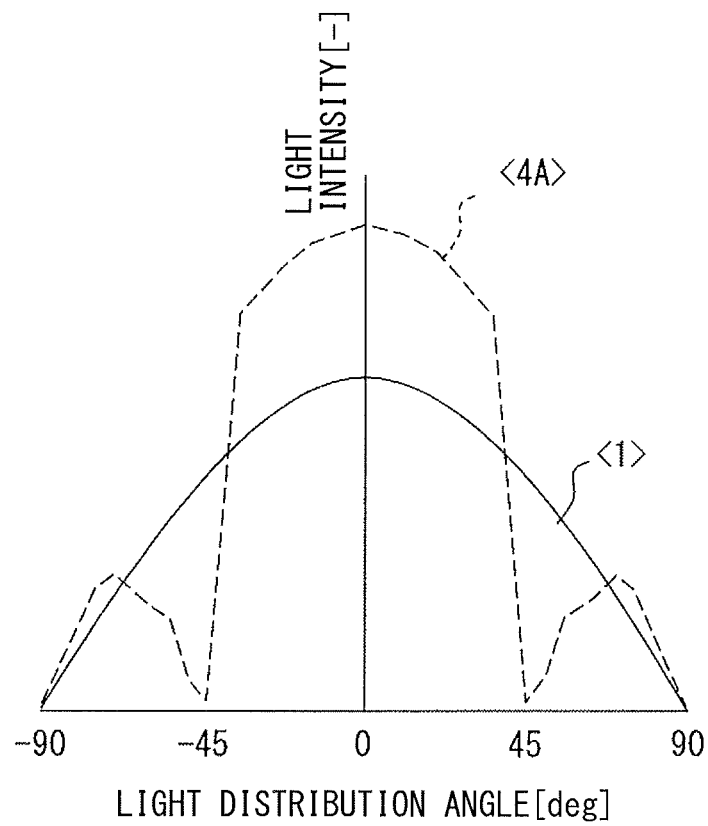

[ FIG. 3C ]
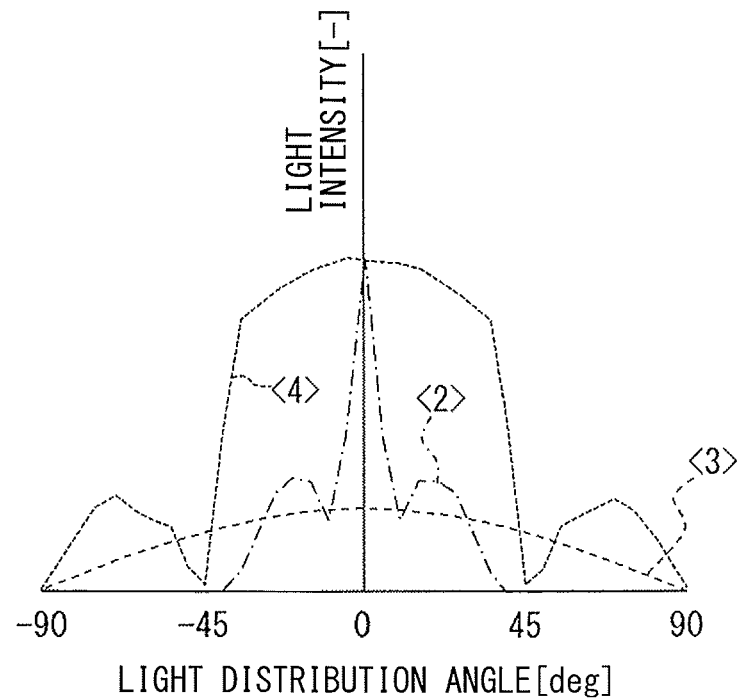
[ FIG. 3D ]
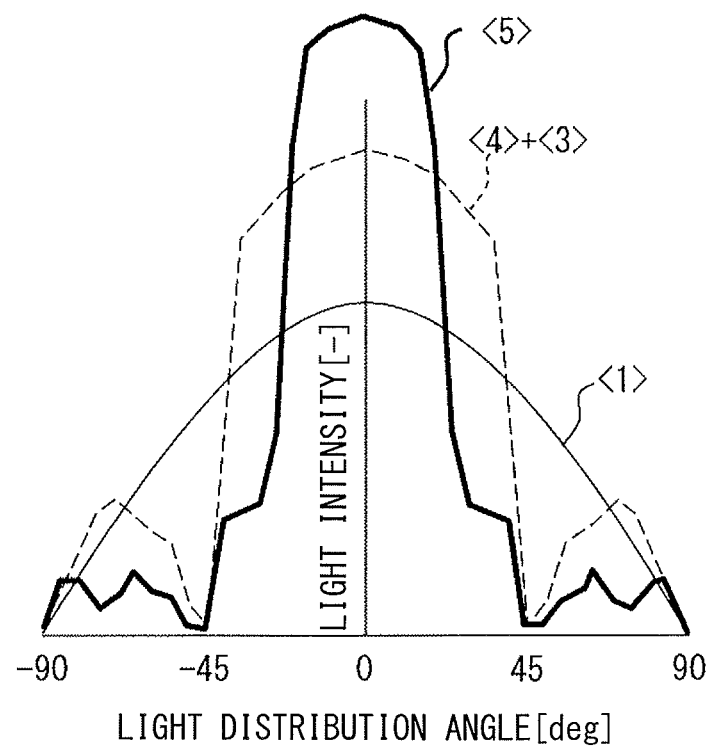

[ FIG. 4 ]
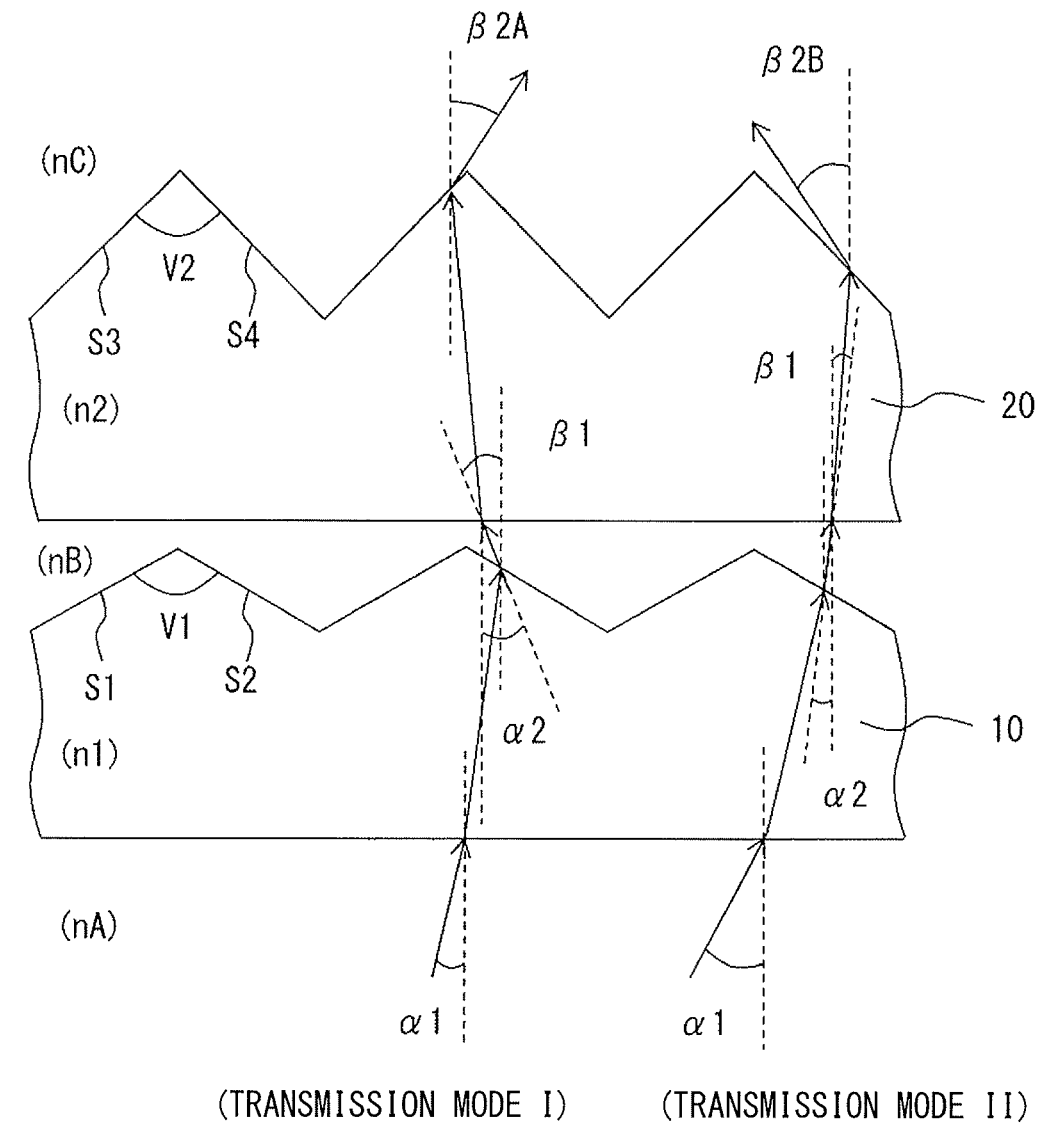

[FIG. 5]
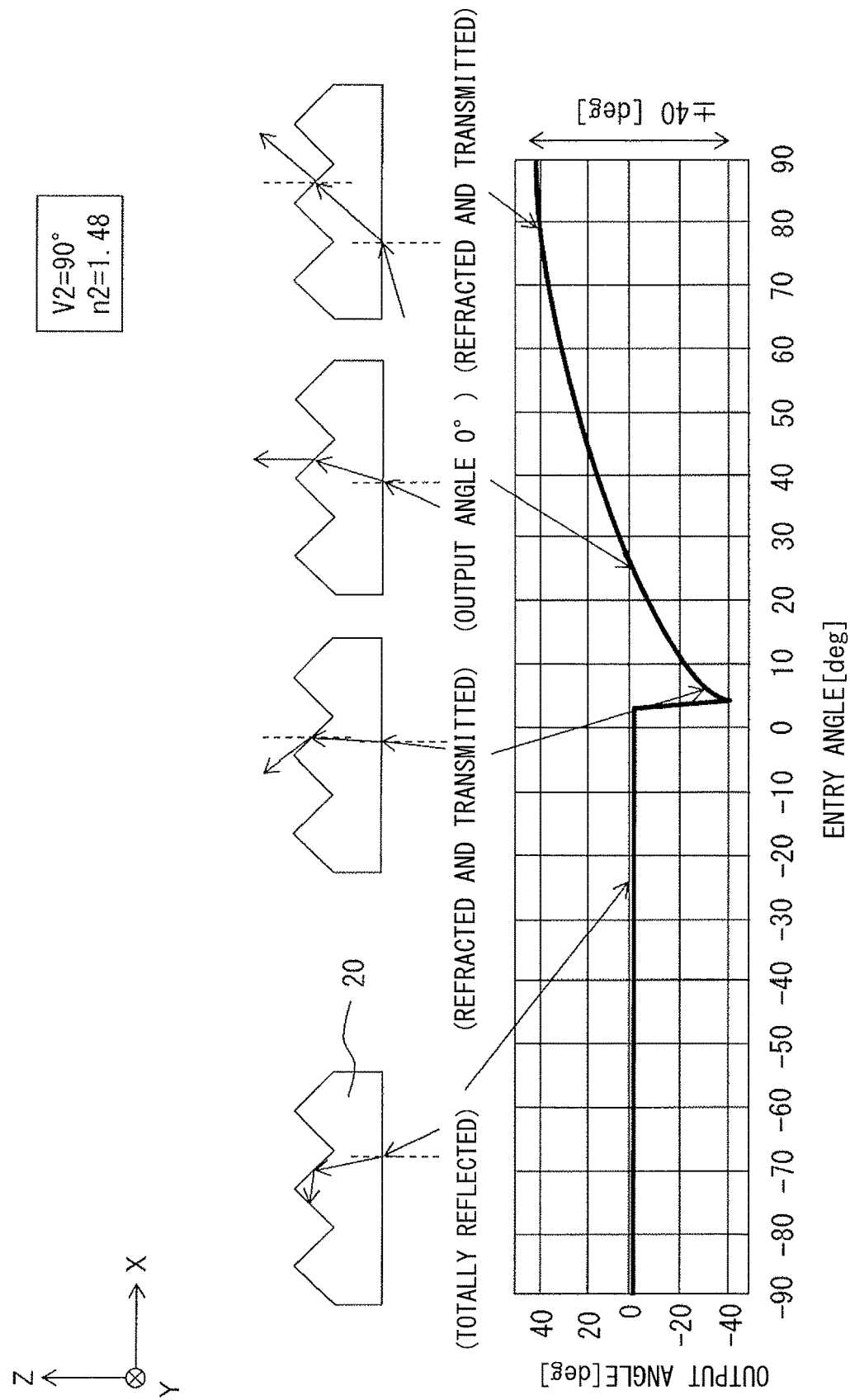

[ FIG. 6 ]
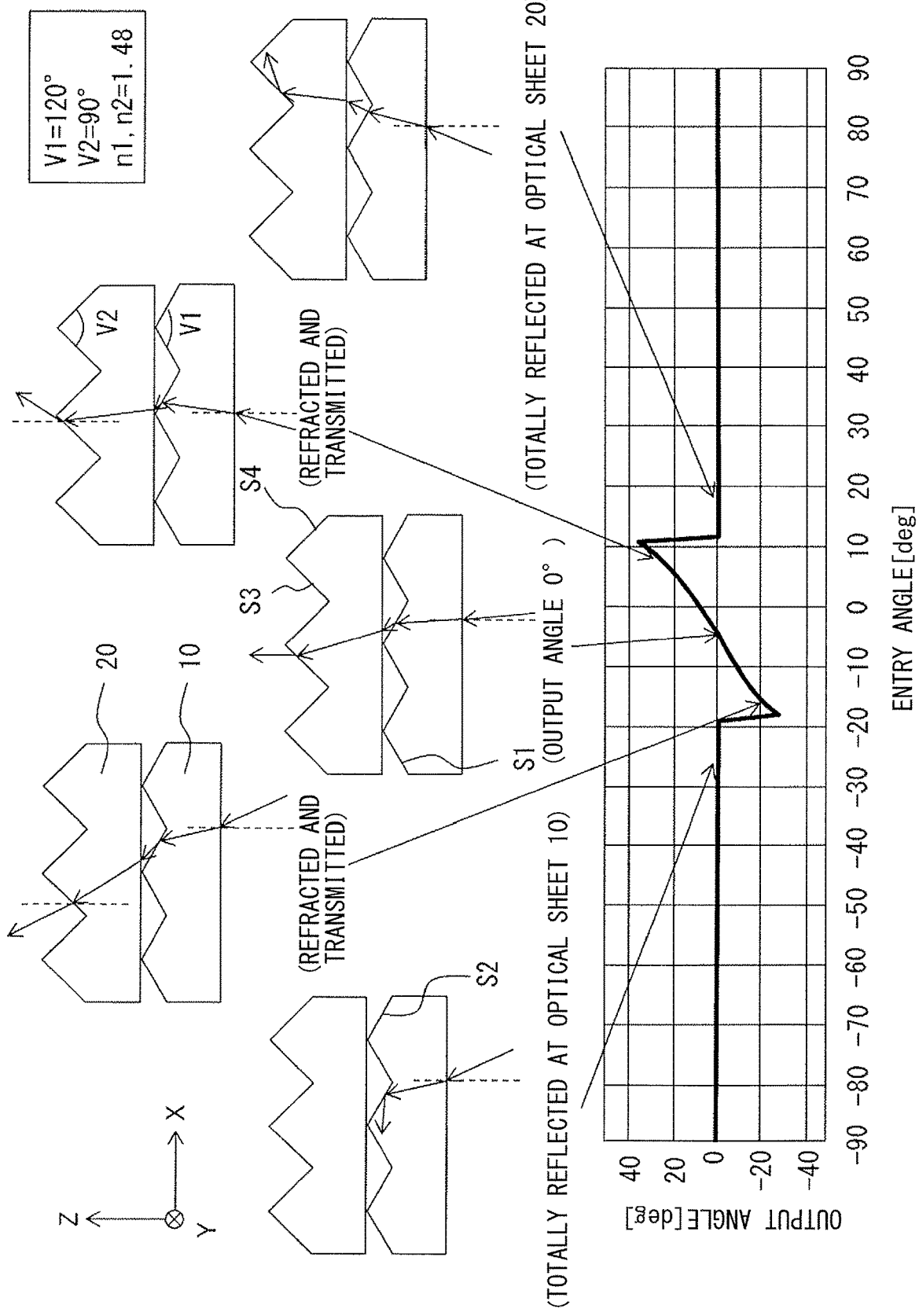

[FIG. 7]
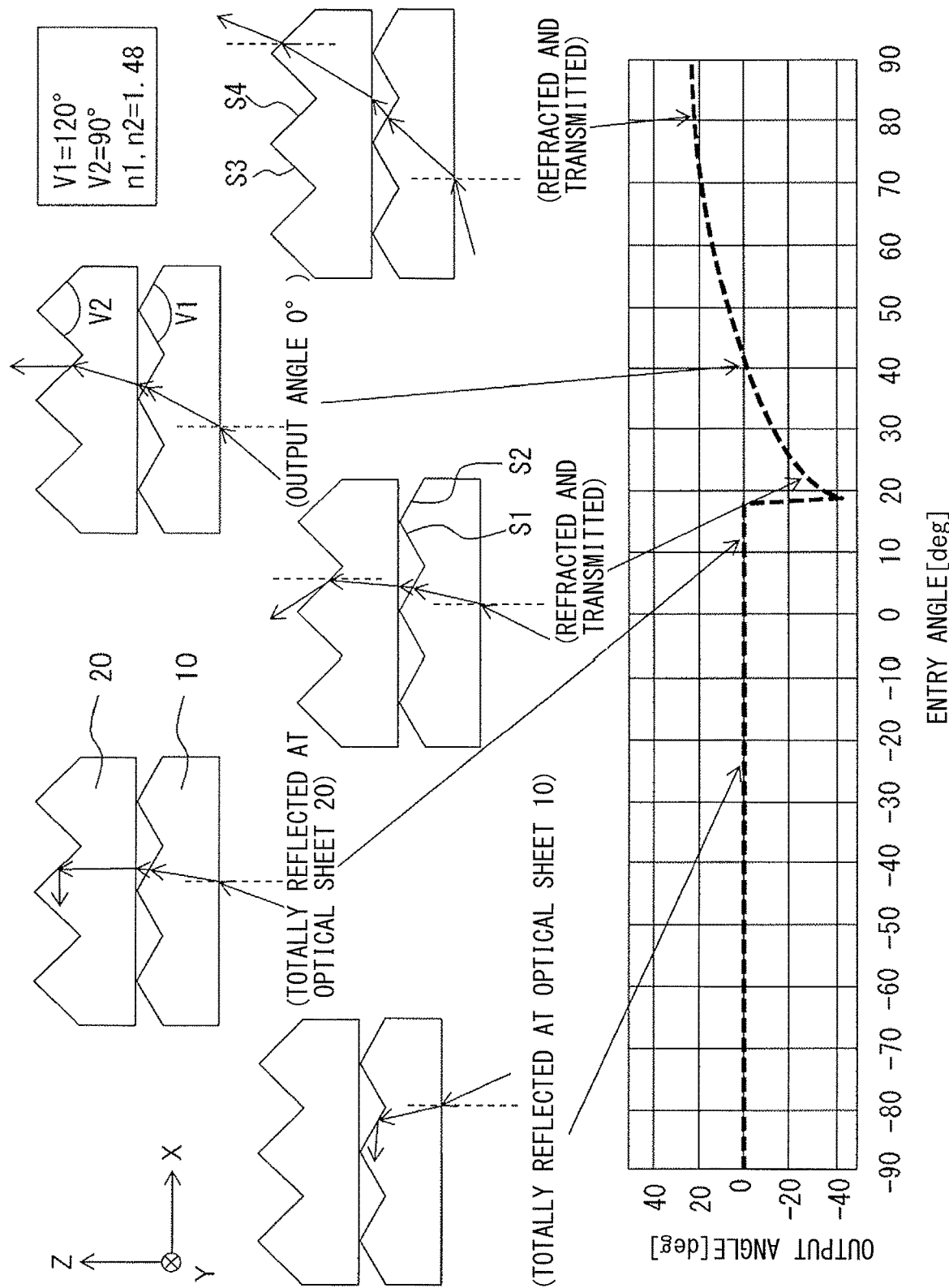

[ FIG. 8 ]
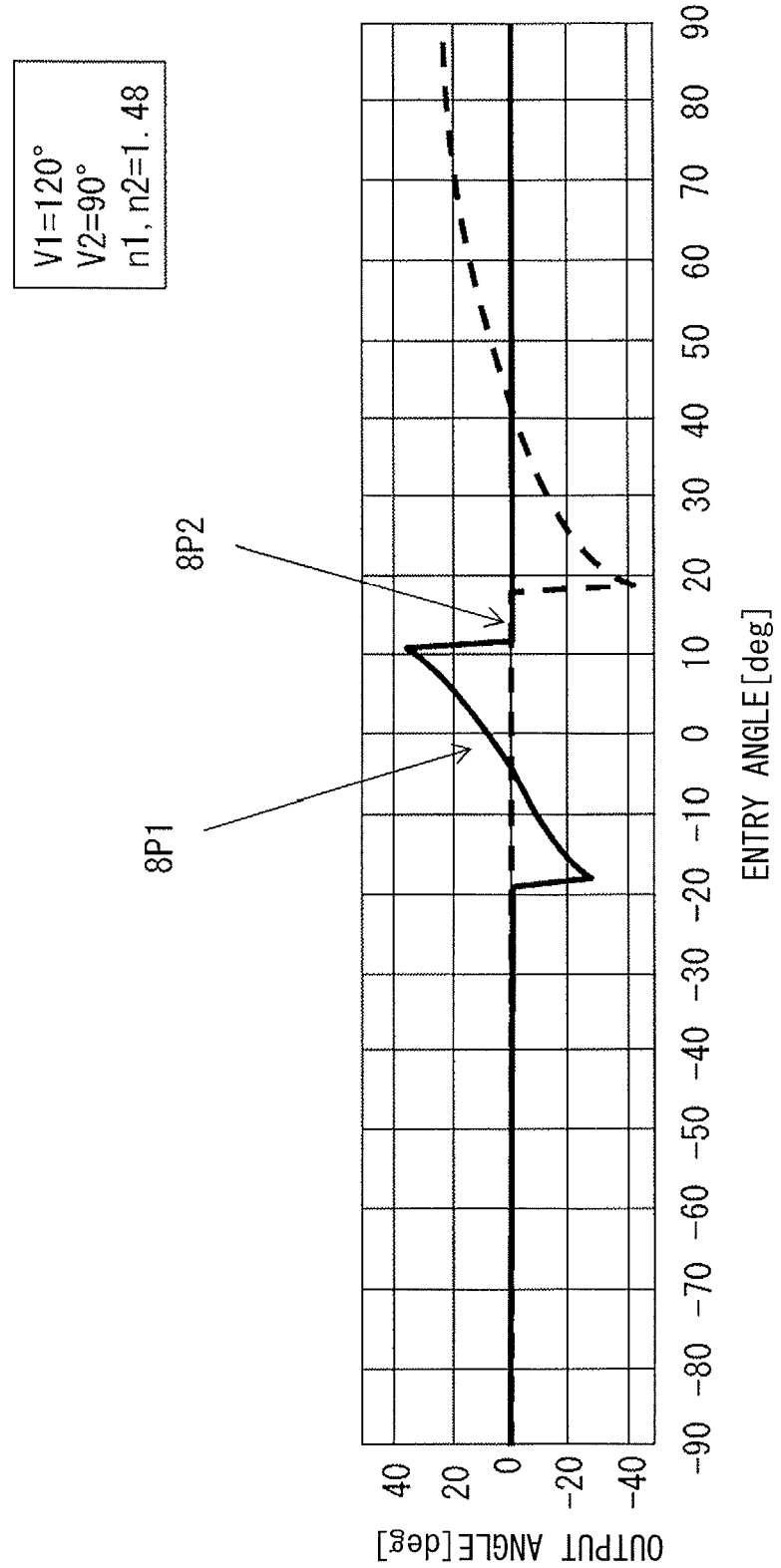

[ FIG. 9 ]
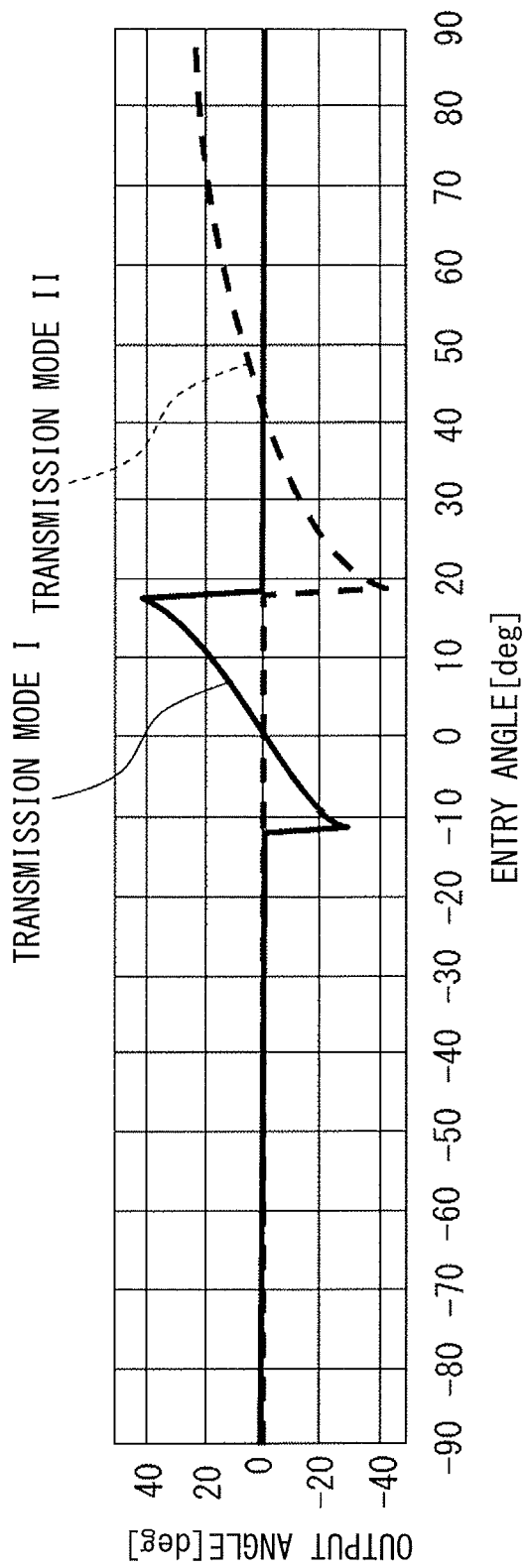

[ FIG. 10 ]
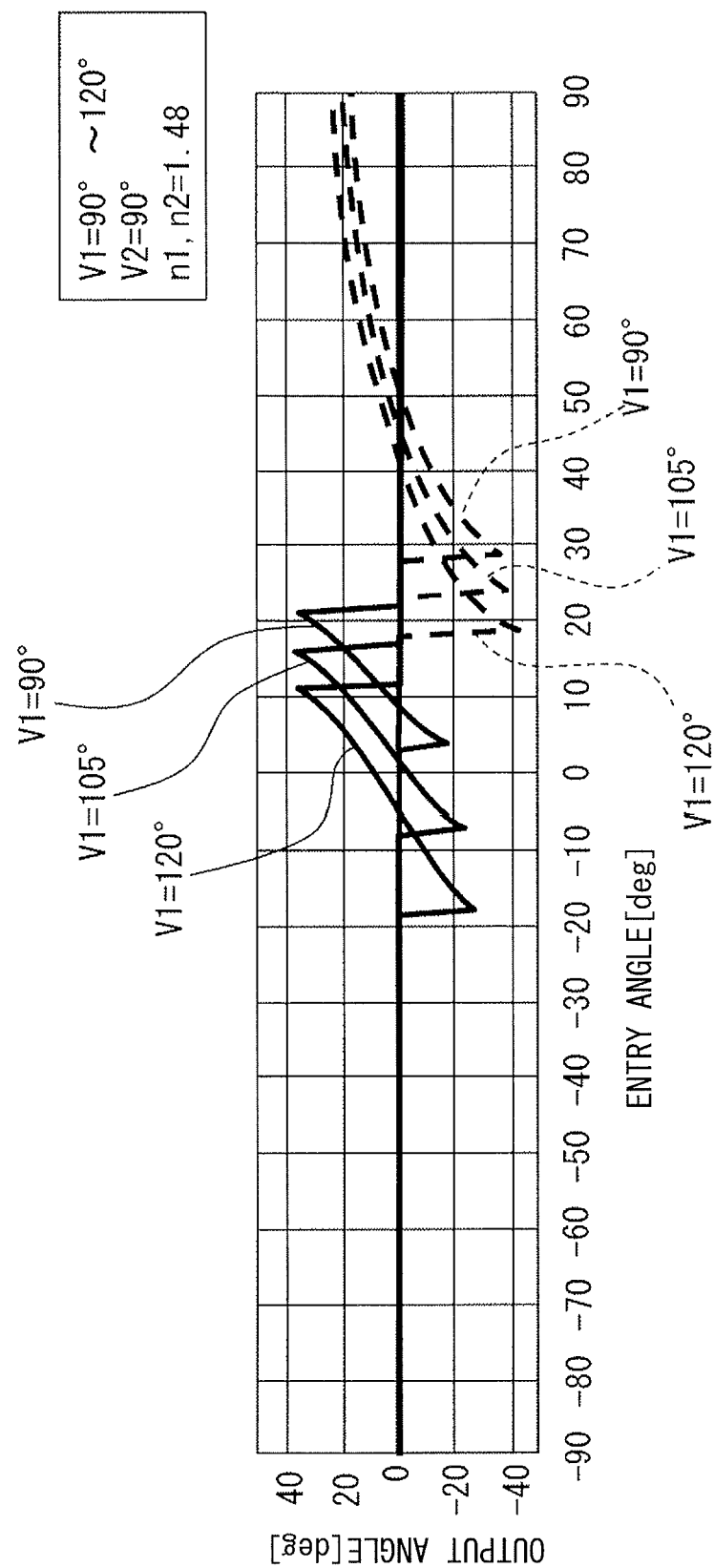

[FIG. 11]
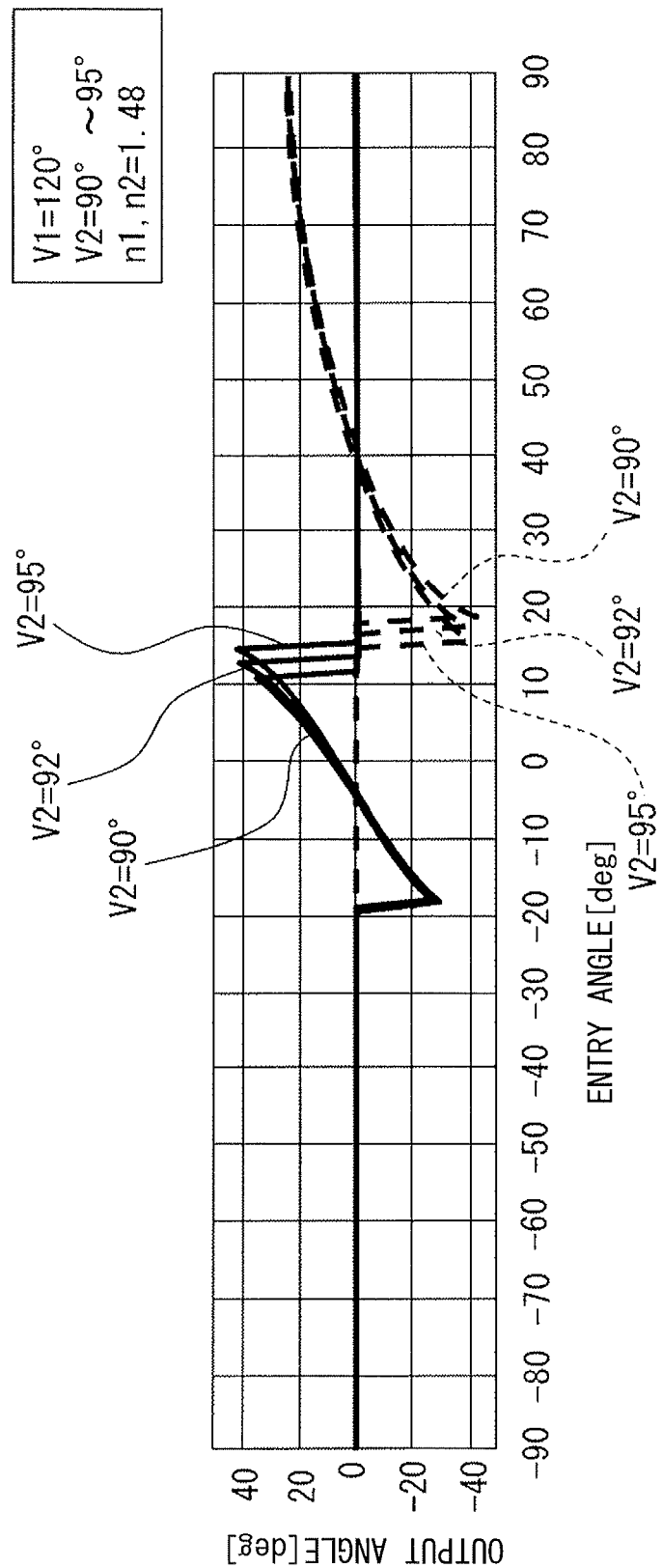

[ FIG. 12 ]
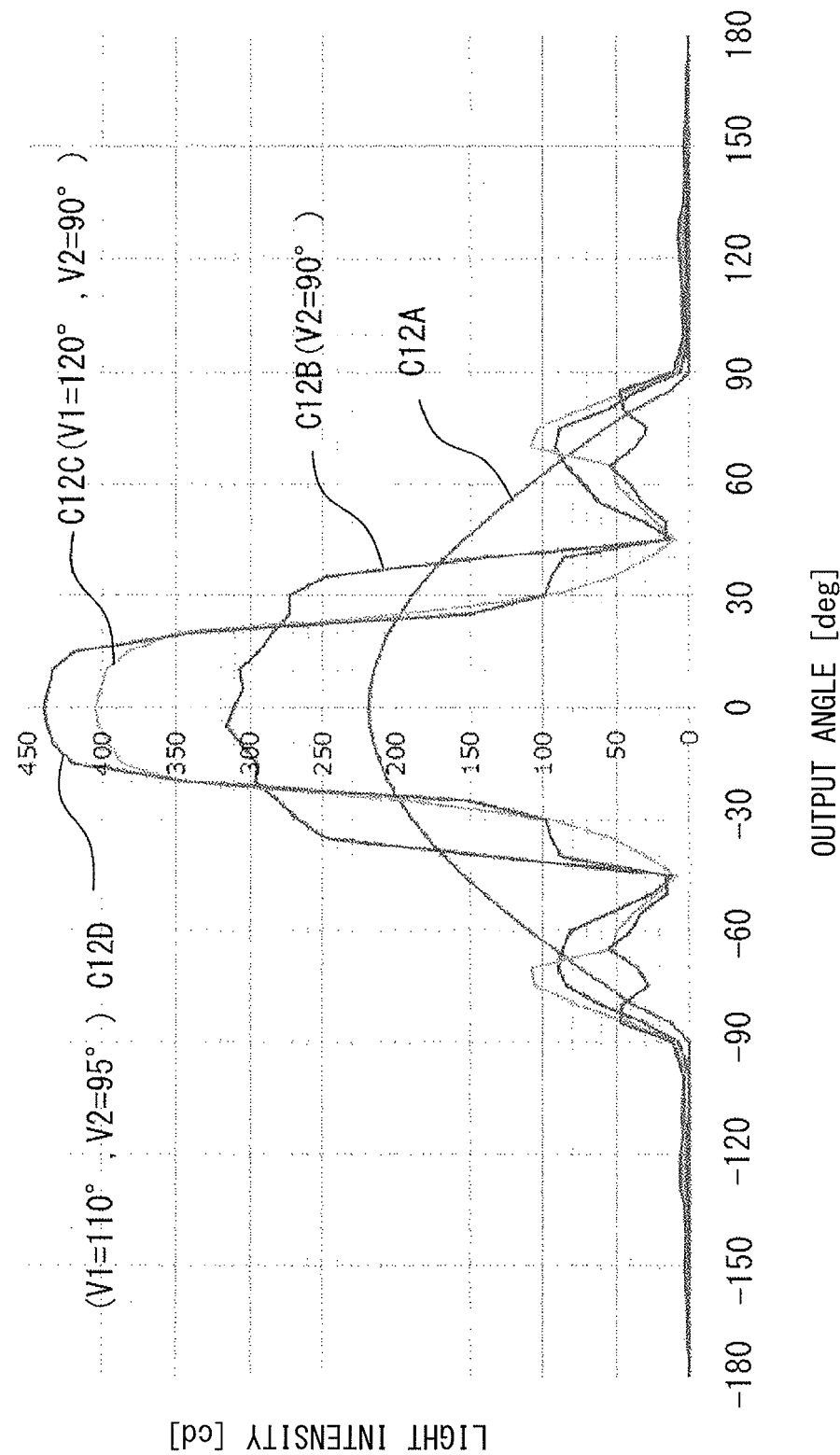

[ FIG. 13 ]
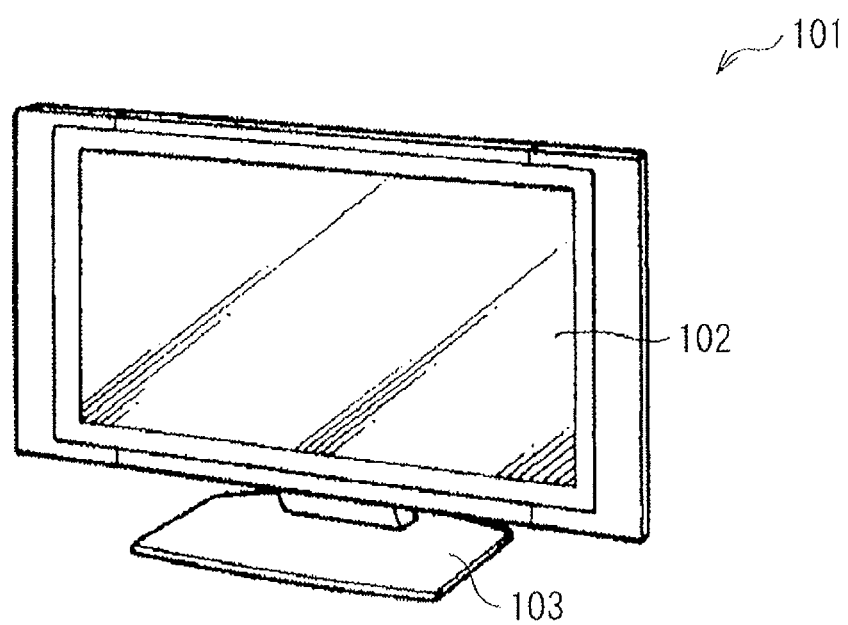

[ FIG. 14 ]
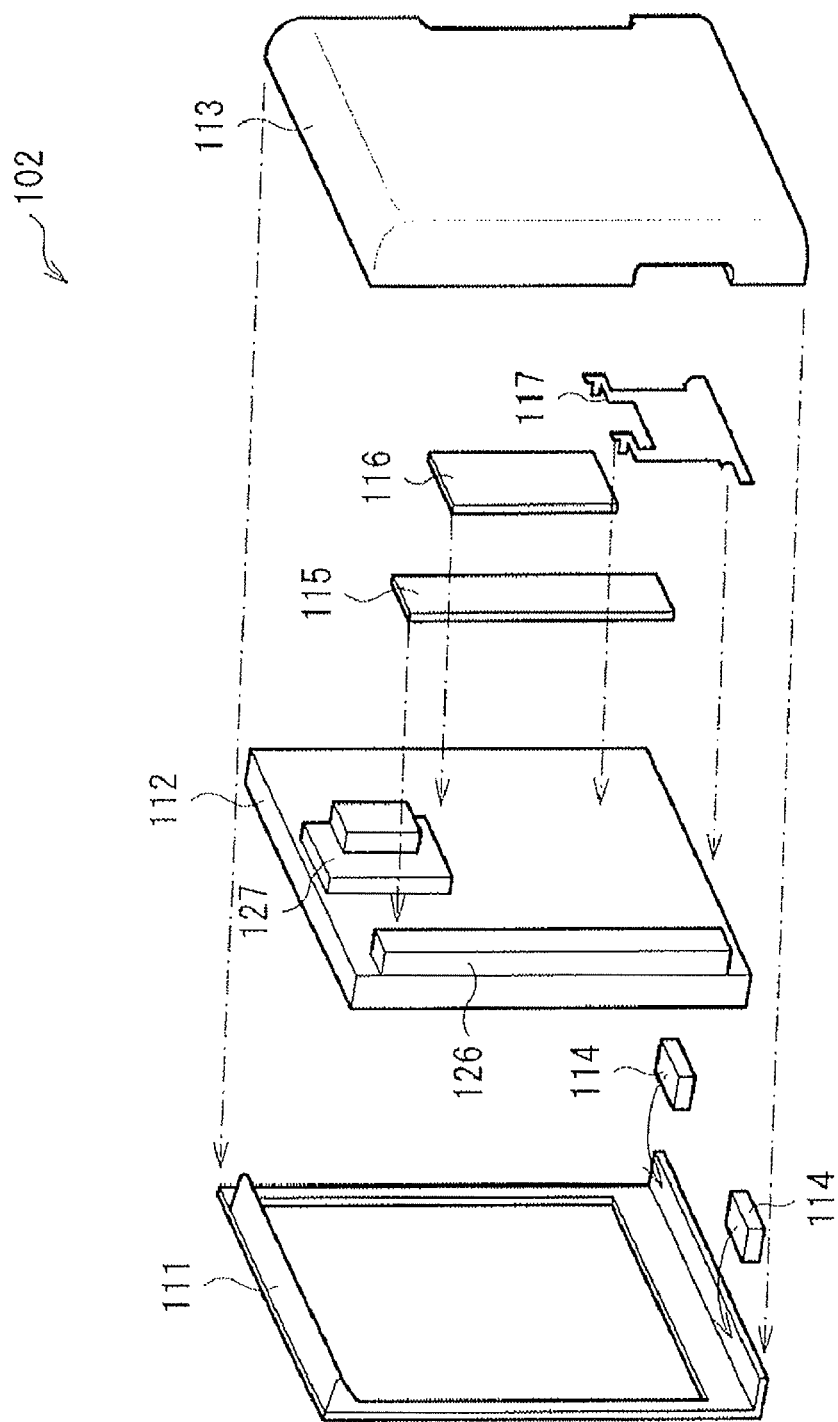

[ FIG. 15 ]
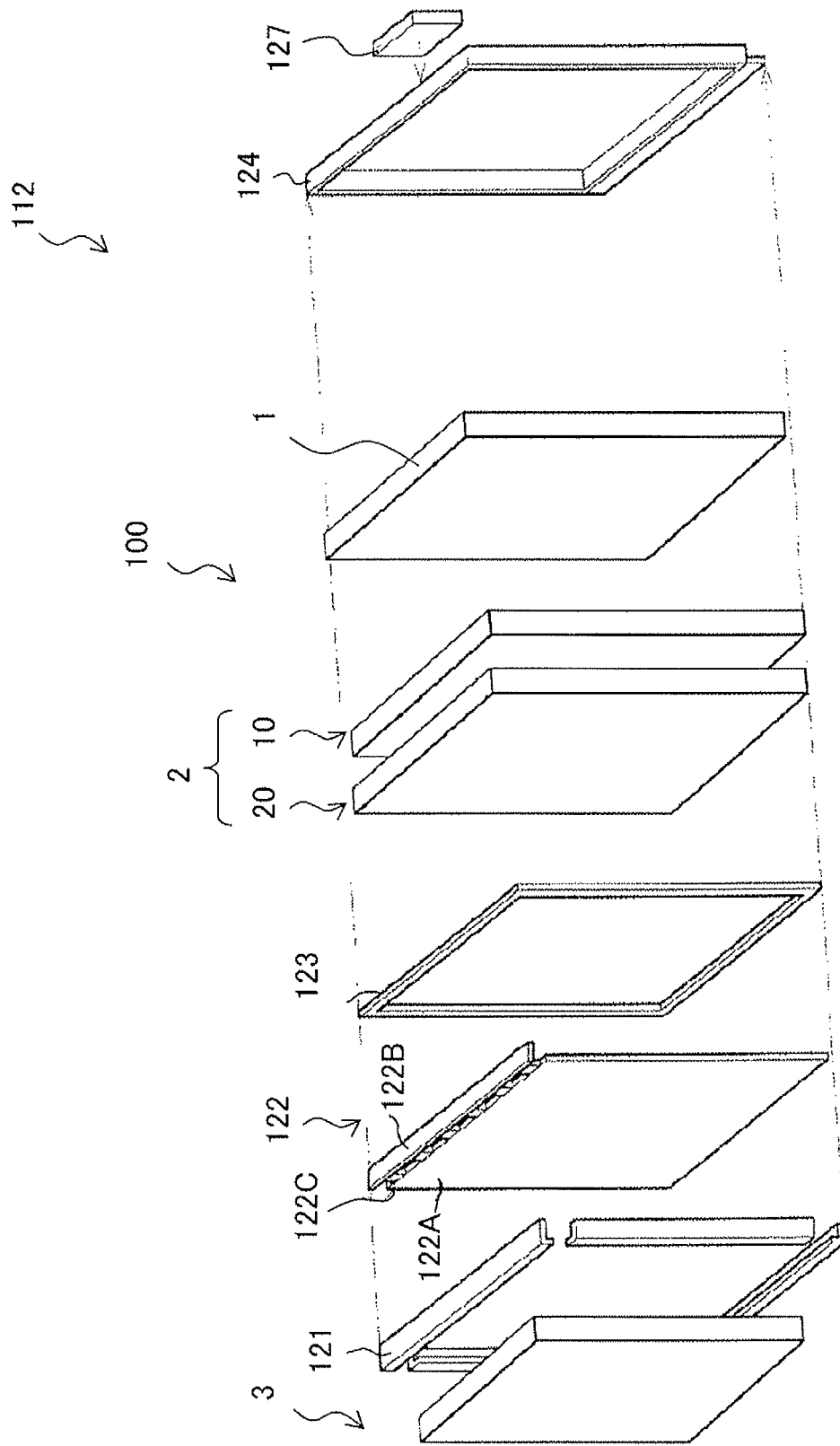

[ FIG. 16A ]
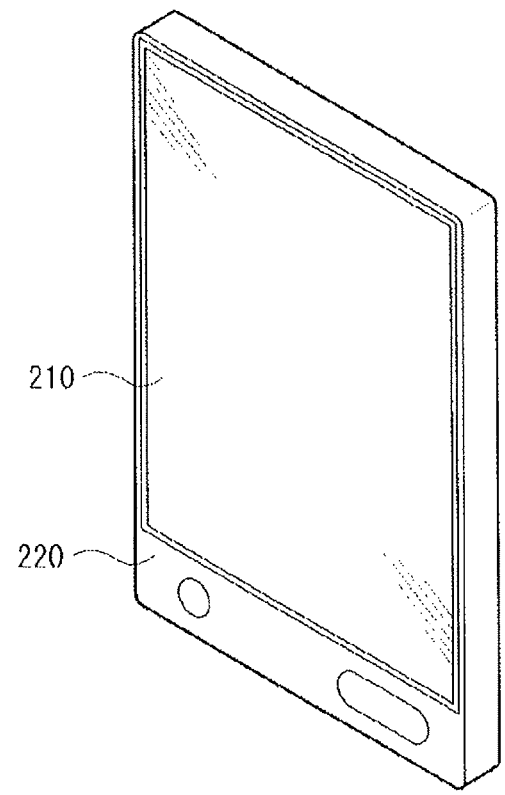
[ FIG. 16B ]
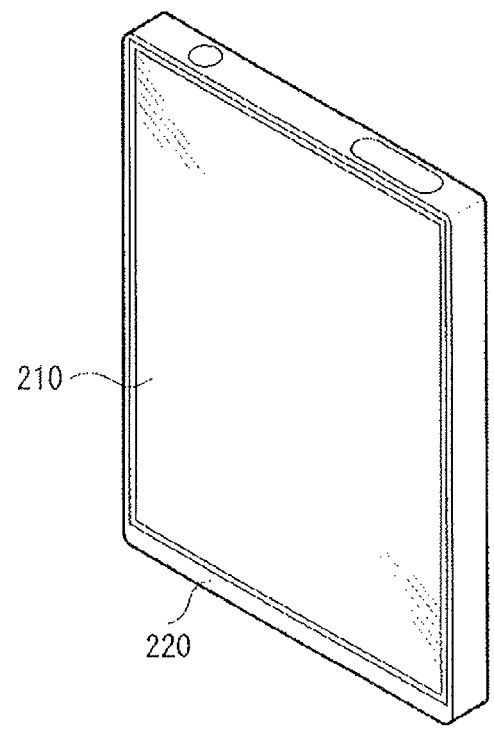

[ FIG. 17 ]
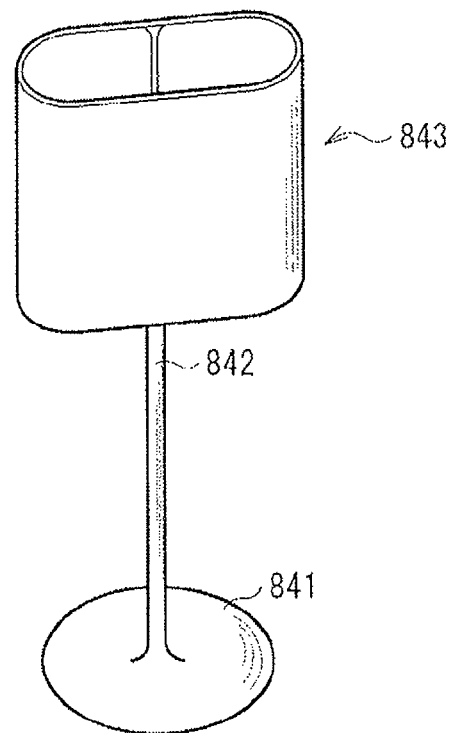
[ FIG. 18 ]
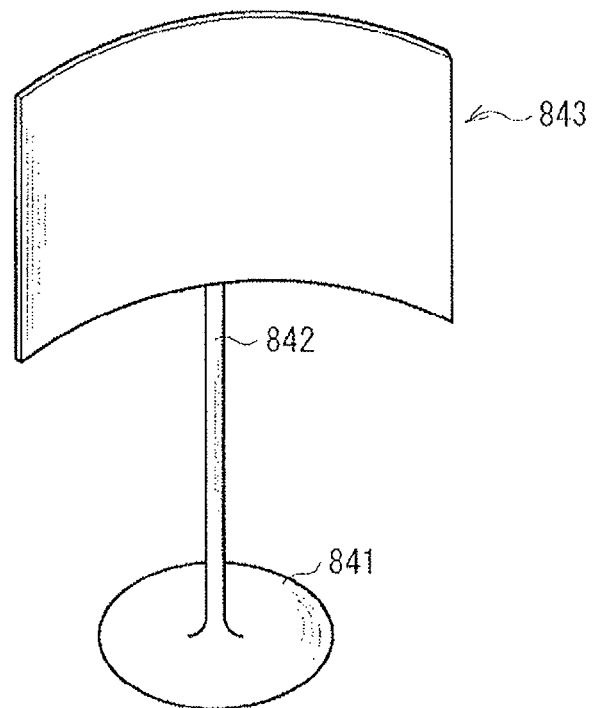

[ FIG. 19 ]
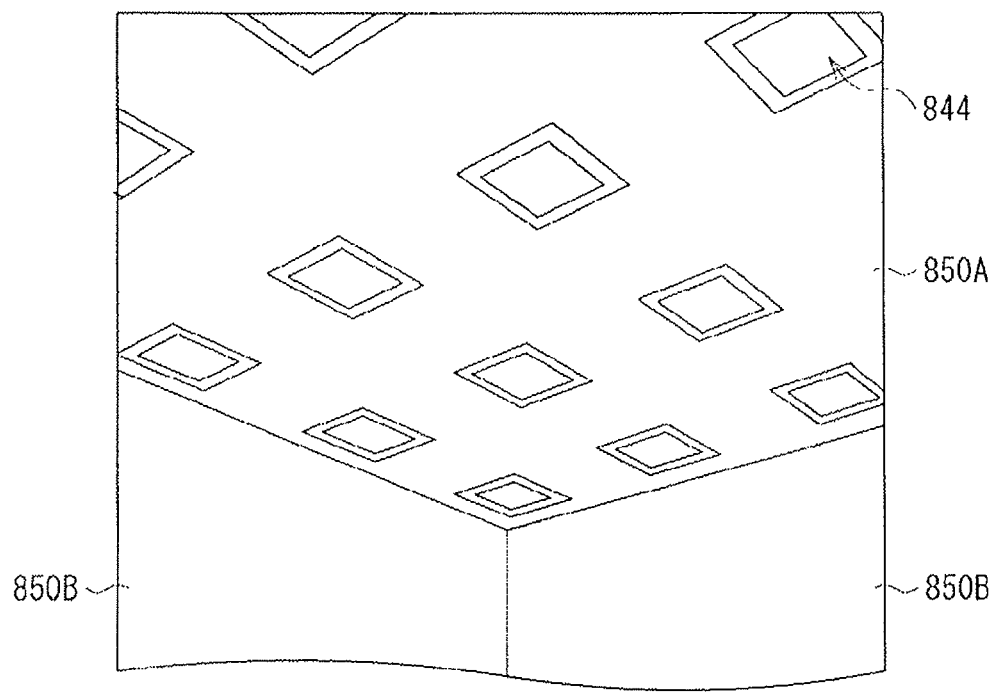

OPTICAL MEMBER, LIGHT-EMITTING DEVICE, DISPLAY, AND ILLUMINATOR

CROSS-REFERENCE TO RELATED APPLICATIONS

This application is a national phase entry under 35 U.S.C. § 371 of International Application No. PCT/JP2018/013135 filed Mar. 29, 2018, which claims the priority from Japanese Patent Application No. 2017-108337 filed in the Japanese Patent Office on May 31, 2017, the entire contents of which are hereby incorporated by reference.

TECHNICAL FIELD

The present disclosure relates to an optical member that performs light distribution adjustment on incoming light, and relates to a light-emitting device, a display, and an illuminator each provided with the optical member.

BACKGROUND ART

Various techniques have so far been suggested as an optical member that, upon allowing an incoming light ray to be transmitted therethrough, adjusts a light distribution characteristic of the transmitted light (for example, refer to NPTL 1).

CITATION LIST

Non Patent Literature

NPTL 1: LIGHT SHAPING DIFFUSER OVERVIEW [searched on Apr. 21, 2017], Internet <URL: http://www.luminitco.com/products/light-shaping-diffusers>

SUMMARY OF THE INVENTION

Incidentally, such an optical member is expected to achieve a desired light distribution characteristic while having a simple configuration.

Accordingly, it is desirable to provide an optical member that achieves a desired light distribution characteristic while having a simple configuration, and to provide a light-emitting device, a display, and an illuminator each provided with the optical member.

An optical member according to an embodiment of the present disclosure includes a first transparent optical sheet extending along a first surface that is orthogonal to a first axial direction, and a second transparent optical sheet disposed to be superimposed on the first transparent optical sheet in the first axial direction and extending along the first surface. The first transparent optical sheet includes a structure in which a first region and a second region are alternately disposed in a second axial direction parallel to the first surface. The first region outputs first outgoing light that is generated by refracting first incoming light to a first direction along the second axial direction. The first incoming light proceeds along the first axial direction. The second region outputs second outgoing light that is generated by refracting second incoming light to a second direction opposite to the first direction. The second incoming light proceeds along the first axial direction. The second transparent optical sheet includes a structure in which a third region and a fourth region are alternately disposed in a third axial direction parallel to the first surface. The third region outputs third outgoing light that is generated by refracting third incoming light to a third direction along the third axial direction. The third incoming light proceeds along the first axial direction. The fourth region outputs fourth outgoing light that is generated by refracting fourth incoming light to a fourth direction opposite to the third direction. The fourth incoming light proceeds along the first axial direction. Here, an angle formed by the third axial direction with respect to the second axial direction is equal to or greater than 0° and less than 45°.

The optical member according to the embodiment of the present disclosure enhances, for example, light focusing performance to a first axial direction while having a simple configuration.

According to the optical member according to the embodiment of the present disclosure, it is possible to achieve a desired light distribution characteristic while having a simple configuration. Thus, according to a display that includes this optical member, for example, it is possible to achieve a superior viewing angle characteristic. In addition, for example, according to an illuminator that includes this optical member, it is possible to achieve adjustment of directivity of illumination light such as reducing deviation in illuminating light due to a light distribution direction.

It is to be noted that effects of the present disclosure are not limited to the above, and may be any of the effects described below.

BRIEF DESCRIPTION OF DRAWINGS

FIG. 1 is a perspective view of an example of an overall configuration of a light-emitting device according to a first embodiment of the present disclosure.

FIG. 2 is a cross-sectional view of a configuration of a main part of an optical member illustrated in FIG. 1.

FIG. 3A is a schematic cross-sectional view of a path of light transmitted through an optical member as a reference example.

FIG. 3B is a characteristic diagram illustrating a light intensity distribution and so on of source light in the light-emitting device illustrated in FIG. 1.

FIG. 3C is a characteristic diagram that illustrates a light intensity distribution of light that enters the optical member as the reference example illustrated in FIG. 3A.

FIG. 3D is a characteristic diagram illustrating a light intensity distribution and so on of outgoing light from the optical member illustrated in FIG. 1.

FIG. 4 is a schematic cross-sectional view of a path of light transmitted through the optical member illustrated in FIG. 1.

FIG. 5 is a characteristic diagram illustrating a relationship between an entry angle and an output angle in the optical member illustrated as the reference example in FIG. 3.

FIG. 6 is a characteristic diagram illustrating a relationship between an entry angle and an output angle in the optical member illustrated in FIG. 1 (transmission mode I).

FIG. 7 is a characteristic diagram illustrating a relationship between an entry angle and an output angle in the optical member illustrated in FIG. 1 (transmission mode II).

FIG. 8 is a characteristic diagram illustrating a relationship between an entry angle and an output angle in the optical member illustrated in FIG. 1 (overall).

FIG. 9 is another characteristic diagram illustrating a relationship between an entry angle and an output angle in the optical member illustrated in FIG. 1 (overall).

FIG. 10 is another characteristic diagram illustrating a relationship between an entry angle and an output angle in the optical member illustrated in FIG. 1 (overall).

FIG. 11 is another characteristic diagram illustrating a relationship between an entry angle and an output angle in the optical member illustrated in FIG. 1 (overall).

FIG. 12 is a characteristic diagram illustrating an intensity distribution of light outputted from the light-emitting device illustrated in FIG. 1.

FIG. 13 is a perspective view of an appearance of a display according to a second embodiment of the present disclosure.

FIG. 14 is an exploded perspective view of a main body illustrated in FIG. 13.

FIG. 15 is an exploded perspective view of a panel module illustrated in FIG. 14.

FIG. 16A is a perspective view of an appearance of a tablet-type terminal device on which a display according to the present disclosure is mounted.

FIG. 16B is a perspective view of an appearance of another tablet-type terminal device on which the display according to the present disclosure is mounted.

FIG. 17 is a perspective view of an appearance of a first illuminator including a light-emitting unit according to the present disclosure.

FIG. 18 is a perspective view of an appearance of a second illuminator including the light-emitting unit according to the present disclosure.

FIG. 19 is a perspective view of an appearance of a third illuminator including the light-emitting unit device according to the disclosure.

MODES FOR CARRYING OUT THE INVENTION

In the following, some embodiments of the present disclosure are described in detail with reference to the drawings. It is to be noted that the description is given in the following order.
1. First Embodiment (Light-Emitting Device)
   An example of a light-emitting device that includes an optical member having two transparent optical sheets each of which has an uneven structure in a light output surface
2. Second Embodiment (Liquid Crystal Display)
   An example of a liquid crystal display that includes a light-emitting device
3. Application Examples of Display
4. Application Examples of Illuminator
5. Other Modification Examples

1. First Embodiment

[1.1 Configuration of Light-Emitting Device 100]

FIG. 1 is a perspective view of an example of an overall configuration of a light-emitting device 100 as a first embodiment of the present disclosure. For example, the light-emitting device 100 is used as a backlight that illuminates a transmissive liquid crystal panel from behind or as an illuminator in a room, etc. As illustrated in FIG. 1, for example, the light-emitting device 100 includes a light source 1 and an optical member 2. The light source 1 includes, for example, a substrate 1A and a plurality of light-emitting sections 1B arranged in a matrix on the substrate 1A. The optical member 2 includes an optical sheet 10 and an optical sheet 20. The optical sheet 10 is disposed commonly to be opposed to the plurality of light-emitting sections 1B, and the optical sheet 20 is provided on an opposite side of the light source 1 as viewed from the optical sheet 10. It is to be noted that FIG. 1 illustrates an example in which the plurality of light-emitting sections 1B is arranged on the substrate 1A in both an X-axis direction and a Y-axis direction that are orthogonal to each other, but the present disclosure is not limited thereto. In addition, another optical sheet or the like may also be provided between the light-emitting sections 1B and the optical member 2.

In the present specification, a direction of a distance between the light source 1 and the optical member 2 is defined as a Z-axis direction (a front-back direction or a thickness direction), and a top-bottom direction and a left-right direction in each of main surfaces (largest surfaces) of the substrate 1A and the optical sheets 10 and 20 are respectively defined as an X-axis direction and a Y-axis direction. Here, the Z-axis direction is a specific example that corresponds to a "first axial direction" in the present disclosure, and the X-axis direction is a specific example that corresponds to a "second axial direction" in the present disclosure. In addition, an XY-plane that is orthogonal to the Z-axis direction is a specific example that corresponds to a "first surface" in the present disclosure.

The light-emitting sections 1B each include, for example, a light-emitting element that includes an LED (Light Emitting Diode; light-emitting diode). In addition, it is preferable to distribute, in accordance with Lambert's law, light emitted from the light-emitting sections 1B by interposition of another optical sheet between the light-emitting sections 1B and the optical member 2, or the like.

[1.2 Configuration of Optical Member 2]

As described earlier, the optical member 2 includes the optical sheet 10 and the optical sheet 20 that are disposed to be superimposed on each other in the Z-axis direction and each extend along the XY-plane. Each of the optical sheet 10 and the optical sheet 20 is a so-called prism sheet having a thickness in the Z-axis direction, and includes, for example, a transparent body such as glass or thermoplastic resin having a relatively high refractive index. The optical sheet 10 has a surface 10S1 and a surface 10S2. The surface 10S1 is disposed on a side opposite to the optical sheet 20, that is, is opposed to the plurality of light-emitting sections 1B in the light source 1, and the surface 10S2 is disposed on a side opposite to the surface 10S1 and is opposed to the optical sheet 20. In the optical sheet 10, light coming from the light-emitting section 1B enters the surface 10S1, and then is outputted from the surface 10S2. The optical sheet 20 has a surface 20S1 and a surface 20S2. The surface 20S1 is opposed to the surface 10S2 of the optical sheet 10, and the surface 20S2 is provided on a side opposite to the surface 20S1. In the optical sheet 20, light having been transmitted through the optical sheet 10 enters the surface 20S1, and then is outputted from the surface 20S2.

Here, the optical sheet 10 is a specific example that corresponds to a "first transparent optical sheet" in the present disclosure, and the optical sheet 20 is a specific example that corresponds to a "second transparent optical sheet" in the present disclosure. In addition, the surface 10S1 is a specific example that corresponds to a "first light entry surface" in the present disclosure, and the surface 20S1 is a specific example that corresponds to a "second light entry surface" in the present disclosure.

Next, configurations of the optical sheet 10 and the optical sheet 20 are described in detail with reference to FIG. 2. FIG. 2 is an enlarged cross-sectional view of a portion of the optical member 2 in the light-emitting device 100, and illustrates a cross-section in a direction of an arrow along II-II line illustrated in FIG. 1.

As illustrated in FIG. 2, the optical sheet 10 includes a structure in which regions 11 and regions 12 are alternately disposed in the X-axis direction. Specifically, for example, the surface 10S1 is a flat surface parallel to the XY-plane, while the surface 10S2 has a plurality of projections T1 disposed side by side along the X-axis direction. For example, each of the projections T1 is a triangular-prismatic portion extending in the Y-axis direction as a height direction, and includes a vertex P1 at which an inclined surface S1 and an inclined surface S2 are in contact with each other to form a vertex angle V1. The inclined surface S1 occupies the region 11, and the inclined surface S2 occupies the region 12.

Likewise, the optical sheet 20 includes a structure in which regions 21 and regions 22 are alternately disposed in the X-axis direction. Specifically, for example, the surface 20S1 is a flat surface parallel to the XY-plane, while the surface 20S2 has a plurality of projections T2 disposed side by side along the X-axis direction. Each of the projections T2 is a triangular-prismatic portion extending in the Y-axis direction as a height direction, and includes a vertex P2 at which an inclined surface S3 and an inclined surface S4 are in contact with each other to form a vertex angle V2. The inclined surface S3 occupies the region 21, and the inclined surface S4 occupies the region 22. Here, it is preferable that the vertex angle V1 be greater than the vertex angle V2. In addition, it is preferable that the vertex angle V1 be equal to or greater than 90° and equal to or smaller than 130°, and that the vertex angle V2 be equal to or greater than 90° and equal to or smaller than 95°.

Here, it is preferable that a plurality of regions 11 each have substantially the same width W11 in the X-axis direction, and a plurality of regions 12 each have substantially the same width W2 in the X-axis direction. In other words, it is preferable that the plurality of regions 11 and the plurality of regions 12 be disposed at a constant pitch (the width W1+ the width W2) in the X-axis direction. Likewise, it is preferable that a plurality of regions 21 each have substantially the same width W3 in the X-axis direction, and a plurality of regions 22 each have substantially the same width W4 in the X-axis direction. In other words, it is preferable that the plurality of regions 21 and the plurality of regions 22 be disposed at a constant pitch (the width W3+ the width W4) in the X-axis direction. It is to be noted that FIG. 2A illustrates an example of a case where a position of the region 11 in the X-axis direction and a position of the region 21 in the X-axis direction coincide with each other, but the present disclosure is not limited thereto. Likewise, FIG. 2A illustrates an example of a case where a position of the region 12 in the X-axis direction and a position of the region 22 in the X-axis direction coincide with each other, but the present disclosure is not limited thereto. Furthermore, the width W1 and the width W2 may coincide with each other or may be different from each other. Likewise, the width W3 and the width W4 may coincide with each other or may be different from each other.

In the region 11 in the optical sheet 10, in a case where incoming light L11A that proceeds along the Z-axis direction enters the surface 10S1, outgoing light L11B, which is generated by refracting the incoming light L11A to a +X direction along the X-axis direction, is outputted from the inclined surface S1 in the surface 10S2. Meanwhile, in the region 12 in the optical sheet 10, in a case where incoming light L12A that proceeds along the Z-axis direction enters the surface 10S1, outgoing light L12B, which is generated by refracting the incoming light L12A to a −X direction, is outputted from the inclined surface S2 in the surface 10S2.

Here, the incoming light L11A and the incoming light L12A are specific examples that correspond respectively to "first incoming light" and "second incoming light" in the present disclosure.

Likewise, in the region 21 in the optical sheet 20, in a case where incoming light L21A that proceeds along the Z-axis direction enters the surface 20S1, outgoing light L21B, which is generated by refracting the incoming light L21A to the +X direction along the X-axis direction, is outputted from the inclined surface S3 in the surface 20S2. Meanwhile, in the region 22 in the optical sheet 20, in a case where incoming light L22A that proceeds along the Z-axis direction enters the surface 20S1, outgoing light L22B, which is generated by refracting the incoming light L22A to the −X direction, is outputted from the inclined surface S4 in the surface 20S2.

Here, the incoming light L21A and the incoming light L22A are specific examples that correspond respectively to "third incoming light" and "fourth incoming light" in the present disclosure.

[1.3 Workings and Effects of Light-Emitting Device 100]

In the light-emitting device 100, the light-emitting element in the light-emitting section 1B is a point light source, thus causing source light emitted from the light-emitting element in the light-emitting section 1B to spread 360° in all directions. The source light directly enters the optical member 2 without change, or is transmitted through another optical sheet or the like, and then enters the optical member 2. The light that has entered the optical member 2 is sequentially transmitted through the optical sheet 10 and the optical sheet 20, and then is outputted from the surface 20S2 of the optical sheet 20, to be observed as light emission on a side opposite to the light source 1 as viewed from the optical member 2.

In the light-emitting device 100 according to the present embodiment, the optical sheet 10 and the optical sheet 20, each of which is a prism sheet that refracts and outputs incoming light in the XY-plane, are disposed to be superimposed on each other in the Z-axis direction. This makes it possible to focus more components of the source light emitted from the light source 1 to a front direction (+Z direction).

FIG. 3A schematically illustrates a path of the source light in a case of using only the optical sheet 20 as a reference example. For example, as illustrated in FIG. 3B, source light <1> from the light source 1 has a light-distribution angular distribution that follows Lambert's law. It is to be noted that FIG. 3B is a characteristic diagram that schematically illustrates a relationship between a light distribution angle [deg] and a light intensity [−] of each light ray. For example, there is a case where the source light <1> enters the surface 20S1 and then is totally reflected at the inclined surface S3 or inclined surface S4, to return to a side of the light source 1 as return light <2>. The return light <2> is reflected and diffused at the substrate 1A and the like in the light source 1, and proceeds back to the optical member 2 as recycle light <3>. As with the source light <1>, this recycle light <3> also has a light-distribution angular distribution that follows the Lambert's law, but has smaller intensity than the source light <1>. A portion of the source light <1> is not totally reflected at the inclined surface S3 and the inclined surface S4, and becomes direct outgoing light <4> that is directly transmitted through the inclined surface S3 and the inclined surface S4. Eventually, the return light <3> is not totally reflected at the inclined surface S3 and the inclined surface S4, and becomes a component that is transmitted through the inclined surface S3 and the inclined surface S4. The direct outgoing light <4> and the return light <3> contribute to light emission performance of the light-emitting device 100 as outgoing light <4A>. FIG. 3B also illustrates a relationship between a light distribution angle and a light intensity of the outgoing light <4A>. In addition, FIG. 3C illustrates a relationship between a light distribution angle and a light intensity of each of the return light <2>, the recycle light <3>, and the direct outgoing light <4>. In addition, for example, a portion of the source light <1> is totally reflected at the inclined surface S3, and then is transmitted through the inclined surface S4 to proceed in the +X direction and the like on instead of proceeding in the +Z direction, to become loss light <6> that does not contribute to light emission in the +Z direction. A comparison between the source light <1> illustrated in FIG. 3B and the outgoing light <4> illustrated in FIG. 3C shows that component light having a light distribution angle exceeding 45° in the source light <1> is lost.

In contrast, in the optical member 2 according to the present embodiment, the optical sheet 10 is inserted between the optical sheet 20 and the light source 1. As schematically illustrated in FIG. 3D, for example, this makes it possible to reduce the loss in the source light <1> and obtain outgoing light <5> having a higher intensity while narrowing the light distribution angle.

FIG. 4 schematically illustrates a path of light transmitted through the optical member 2. In FIG. 4, nA is a refractive index of a medium (for example, air) between the light source 1 and the optical sheet 10, nB is a refractive index of a medium (for example, air) between the optical sheet 10 and the optical sheet 20, and nC is a refractive index of a medium (for example, air) between the optical sheet 20 and an observer. In addition, n1 is a refractive index of the optical sheet 10, and n2 is a refractive index of the optical sheet 20. In addition, α1 and α2 are each an entry angle of light, and β1, β2A, and β2B are each an output angle of light. However, α2 and β1 are equal. Note that in the path of the light transmitted through the optical member 2, there are a transmission mode I and a transmission mode II. In the transmission mode I, for example, the light transmitted through the inclined surface S2 proceeds to be transmitted through the inclined surface S3. In the transmission mode II, for example, the light transmitted through the inclined surface S2 proceeds to be transmitted through the inclined surface S4. In any of the modes, the output angle β1 at the optical sheet 10 is given by the following expression (1).

$$\beta 1 = \arcsin(n1/nb*\sin(\pi/180*((\arcsin(na/n1*\sin(\alpha 1*\pi/180)))*180/\pi-(90-\theta 1/2))))*180/\pi+(90-\theta 1/2) \quad (1)$$

Meanwhile, the output angle β2A at the optical sheet 20 in the transmission mode I is given by the following expression (2).

$$\beta 2A = \arcsin(n2/nc*\sin(\pi/180*((\arcsin(nb/n2*\sin(\alpha 2*\pi/180)))*180/\pi+(90-\theta 2/2))))*180/\pi-(90-\theta 2/2) \quad (2)$$

In addition, the output angle β2B at the optical sheet 20 in the transmission mode II is given by the following expression (3).

$$\beta 2B = \arcsin(n2/nc*\sin(\pi/180*((\arcsin(nb/n2*\sin(\alpha 2*\pi/180)))*180/\pi-(90-\theta 2/2))))*180/\pi-(90-\theta 2/2) \quad (3)$$

FIG. 5 schematically illustrates, as a reference example, a path of the source light in a case of using only the optical sheet 20 without using the optical sheet 10, and also illustrates a relationship between an entry angle [deg] of light that enters the optical sheet 20 and an output angle [deg] of light that is outputted from the optical sheet 20. FIG. 5 illustrates an entry angle and an output angle, assuming that, with a front direction (+Z direction) as a reference (0°), an angle inclined in the +X direction is positive and an angle inclined in the −X direction is negative. As illustrated in FIG. 5, total reflection occurs at the inclined surface S3 or inclined surface S4 at an entry angle of around −90° to +5°, and outgoing light does not emerge. In a case where the entry angle is +5°, outgoing light having an output angle of −40° emerges. As the entry angle becomes larger from +5°, the outgoing light is gradually directed toward the front direction, to become outgoing light toward the +Z direction at an entry angle of around 25°. Subsequently, it is shown that the outgoing light gradually inclines to the +X direction until the entry angle reaches +90°. Thus, in a case of using only the optical sheet 20 without using the optical sheet 10, outgoing light having an output angle in a range of −40° to +40° emerges only in a case where the entry angle is in a range of +5° to +90°. This outgoing light corresponds to the outgoing light <4> described in FIG. 3C.

FIG. 6 schematically illustrates a path of the source light in the transmission mode I described in FIG. 4 in a case of using the optical member 2 according to the present embodiment, and also illustrates a relationship between an entry angle [deg] of light entering the optical sheet 10 and an output angle [deg] of light outputted from the optical sheet 20. Here, the vertex angle V1 is assumed to be 120°, the vertex angle V2 is assumed to be 90°, and the refractive index n1 of the optical sheet 10 and the refractive index n2 of the optical sheet 20 are both assumed to be 1.48. As illustrated in FIG. 6, at an entry angle of −90° to less than −18°, total reflection occurs at the inclined surface S1 or the inclined surface S2 of the optical sheet 10, and outgoing light does not emerge. In a case where the entry angle is −18°, outgoing light having an output angle of about −30° emerges. As the entry angle becomes larger from −18°, the outgoing light is gradually directed toward the front direction, to become outgoing light toward the +Z direction in a case where the entry angle is around −5°. Thereafter, it is shown that the outgoing light gradually inclines toward the +X direction until the entry angle reaches +11°. In a case where the entry angle exceeds +11°, total reflection occurs at the inclined surface S3 or the inclined surface S4 of the optical sheet 20, and outgoing light does not emerge again.

FIG. 7 schematically illustrates a path of the source light in the transmission mode II described in FIG. 4 in a case of using the optical member 2 in the present embodiment, and also illustrates a relationship between the entry angle [deg] of light entering the optical sheet 10 and the output angle [deg] of light outputted from the optical sheet 20. Even in this case, the vertex angle V1 is assumed to be 120°, the vertex angle V2 is assumed to be 90°, and the refractive index n1 of the optical sheet 10 and the refractive index n2 of the optical sheet 20 are both assumed to be 1.48. As illustrated in FIG. 7, at an entry angle of −90° to less than +18°, total reflection occurs at the inclined surface S1 or the inclined surface S2 of the optical sheet 10, or the inclined surface S3 or the inclined surface S4 of the optical sheet 20, and outgoing light does not emerge. In a case where the entry angle is +18°, outgoing light having an output angle of about −30° emerges. As the entry angle becomes larger from +18°, the outgoing light is gradually directed toward the front direction, to become outgoing light toward the +Z direction at an entry angle of around +40°. Thereafter, it is shown that the outgoing light is gradually directed toward the +X direction until the entry angle reaches +90°.

FIG. 8 illustrates superimposition of a curve in the transmission mode I illustrated in FIG. 6 and a curve in the transmission mode II illustrated in FIG. 7. As illustrated, in a case of using the optical member 2, when the entry angle is in a range of −18° to +11° and +18° to +90°, outgoing light having an output angle in a range of −40° to +25° emerges. In other words, as compared to the case in FIG. 5, it is possible to output light having a wider entry angle to the front direction as outgoing light. Accordingly, according to the light-emitting device 100 in the present embodiment, it is possible to enhance front luminance and enhance use efficiency of incoming light. The outgoing light illustrated in FIGS. 6 and 7 corresponds to the outgoing light <5> described in FIG. 3D.

Meanwhile, in an example in FIG. 8, as indicated by an arrow 8P1, incoming light having an entry angle of around 0° emerges as outgoing light having a slightly inclined output angle. In addition, as indicated by an arrow 8P2, incoming light having an entry angle of around +11° to +18° is not transmitted in any of the transmission mode I and the transmission mode II. Therefore, if it is possible to solve these issues, it is possible to further enhance front luminance and further enhance use efficiency of incoming light.

In the optical member 2 in the present embodiment, for example, adjustment of the vertex angle V1 and the vertex angle V2 makes it possible to further enhance front luminance and further enhance use efficiency of incoming light. FIG. 9 illustrates a relationship between an entry angle [deg] of light that enters the optical sheet 10 and an output angle [deg] of light that is outputted from the optical sheet 20 in a case where the vertex angle V1 is assumed to be 110° and the vertex angle V2 is assumed to be 95°.

In an example in FIG. 9, the output angle is 0° in a case where the entry angle is 0°, and moreover outgoing light having an output angle in a range of −40° to +25° emerges in a case where the entry angle is in a range of −11° to +90°.

FIG. 10 illustrates a relationship between an entry angle [deg] of light that enters the optical sheet 10 and an output angle [deg] of light that is outputted from the optical sheet 20 in a case where the vertex angle V1 is changed in a range of 90° to 120° and the vertex angle V2 is fixed to 90°. FIG. 11 illustrates a relationship between an entry angle [deg] of light that enters the optical sheet 10 and an output angle [deg] of light that is outputted from the optical sheet 20 in a case where the vertex angle V1 is fixed to 120° and the vertex angle V2 is changed in a range of 90° to 95°. Thus, only adjustment of the vertex angle V1 and the vertex angle V2 makes it possible to easily optimize the entry angle and the output angle in the optical member 2.

FIG. 12 is a characteristic diagram illustrating a relationship between an output angle and light intensity. A curve C12A indicates a distribution of intensity of source light emitted from the light source 1. A curve C12B indicates a distribution of intensity of light obtained in a case where the source light is transmitted only through the optical sheet 20 (corresponding to FIG. 5). Curves C12C and C12D each indicate a distribution of intensity of light obtained in a case where the source light is sequentially transmitted through the optical sheet 10 and the optical sheet 20 (corresponding respectively to FIGS. 8 and 9). As illustrated in FIG. 12, as compared with the curve C12A and the curve C12B, the curves C12C and C12D show that light intensity is enhanced while widening of the output angle is suppressed.

As described above, in the present embodiment, the optical member 2 in which the optical sheet 10 and the optical sheet 20 are stacked is included, thus making it possible to obtain a desired light distribution characteristic while having a simple configuration. In other words, for example, it is possible to distribute, to the front direction, incoming light that is scattered light, thereby enhancing front luminance and enhancing use efficiency of incoming light.

2. Second Embodiment

FIG. 13 illustrates an appearance of a display 101 according to a third embodiment of the present technology. The display 101 includes the light-emitting device 100, and is used as a thin television apparatus, for example. The display 101 has a configuration in which a flat-plate-shaped main body 102 for image display is supported by a stand 103. It is to be noted that the display 101 is used as a stationary type in a state of being placed on a horizontal surface such as a floor, a shelf, or a table with the stand 103 attached to the main body 102, but it is also possible to use the display 101 as a wall-hanging type with the stand 103 detached from the main body 102.

FIG. 14 illustrates, in an exploded manner, the main body 102 illustrated in FIG. 13. For example, the main body 102 includes, from a front side (viewer side), a front exterior member (bezel) 111, a panel module 112, and a rear exterior member (rear cover) 113 in this order. The front exterior member 111 is a frame-shaped member that covers a front peripheral edge of the panel module 112, and a pair of speakers 114 are provided at the bottom of the front exterior member 111. The panel module 112 is fixed to the front exterior member 111. A power source substrate 115 and a signal substrate 116 are mounted on a back surface of the panel module 112, and a mounting bracket 117 is fixed to the back surface of the panel module 112. The mounting bracket 117 is intended for attachment of a wall-hanging bracket, attachment of a substrate and so on, and attachment of the stand 103. The rear exterior member 113 covers the back surface and a side surface of the panel module 112.

FIG. 15 illustrates, in an exploded manner, the panel module 112 illustrated in FIG. 14. For example, the panel module 112 includes, from a front side (viewer side), an optical member 3 as a second optical member, a front housing (top chassis) 121, a liquid crystal panel 122, a frame-shaped member (middle chassis) 123, the optical member 2 as a first optical member, the light source 1, a rear housing (back chassis) 124, and a timing controller substrate 127 in this order. The optical member 2 and the light source 1 are included in the light-emitting device 100. The optical member 3 is provided on a side opposite to the optical member 2 as viewed from the liquid crystal panel 122, and outputs image light incoming from the liquid crystal panel 122 to a side opposite to the liquid crystal panel 122 (viewer side) in an output angle range wider than an entry angle range of the image light. For example, it is preferable that the optical member 3 have a light intensity distribution characteristic approximated to a light intensity distribution characteristic that follows Lambert's law. Providing such an optical member 3 allows the display 101 to reduce deviation in luminance due to a difference in viewing angle, thus making it possible to visually recognize an image having a substantially constant luminance when viewed from any direction.

The front housing 121 is a frame-shaped metal component that covers a front peripheral edge of the liquid crystal panel 122. For example, the liquid crystal panel 122 includes a liquid crystal cell 122A, a source substrate 122B, and a flexible substrate 122C such as a COF (Chip on Film) that couples these components. A frame-shaped member 123 is a frame-shaped resin component that holds the liquid crystal panel 122. The rear housing 124 is a metal component that includes iron (Fe) and the like and accommodates the liquid crystal panel 122, the frame-shaped member 123, and the light-emitting device 100. The timing controller substrate 127 is also mounted on a back surface of the rear housing 124.

In the display 101, light from the light-emitting device 100 is selectively transmitted through the liquid crystal panel 122, thus performing image display. Here, as described in the first embodiment, the light-emitting device 100 having a superior light distribution characteristic and enhanced luminous efficiency is included, thus making it possible to expect enhancement in display quality of the display 101.

3. Application Examples of Display

Examples of application of the display 101 as described above to an electronic apparatus are described below. Examples of the electronic apparatus includes a television apparatus, a digital camera, a laptop personal computer, a mobile terminal device such as a mobile phone, or a video camera. In other words, it is possible to apply the above-described display to an electronic apparatus in any field, which displays, as an image or video, an image signal inputted from outside or an image signal that is internally generated.

FIG. 16A illustrates an appearance of a tablet-type terminal device to which the display 101 according to the foregoing embodiment is applied. FIG. 16B illustrates an appearance of another tablet-type terminal device to which the display 101 according to the foregoing embodiment is applied. Each of these tablet-type terminal devices includes, for example, a display section 210 and a non-display section 220, and the display section 210 includes the display 101 according to the foregoing embodiment.

4. Application Examples of Illuminator

FIGS. 17 and 18 each illustrate an appearance of a tabletop illuminator to which the light-emitting device 100 or the like according to the foregoing embodiment is applied. For example, this illuminator includes an illuminating section 843 that is attached to a columnar support 842 provided on a base 841. The illuminating section 843 includes the light-emitting device 100 and so on. It is possible to provide, to the illuminating section 843, any shape such as a cylindrical shape illustrated in FIG. 17 or a curved surface shape illustrated in FIG. 18 by providing a curved shape to the substrate 1A, the optical member 2, and so on.

FIG. 19 illustrates an appearance of an indoor illuminator to which the light-emitting device 100 and so on according to the foregoing embodiment is applied. This illuminator includes an illuminating section 844 that includes the light-emitting device 100. On a ceiling 850A of a building, an appropriate number of illuminating sections 844 are disposed at an appropriate interval. It is to be noted that it is possible to install the illuminating section 844 not only on the ceiling 850A but also at any place such as a wall 850B or a floor (not illustrated) in accordance with intended use.

These illuminators perform illumination by light from the light-emitting device 100 and so on. Included here is the light-emitting device 100 having superior light emission efficiency and obtaining a desired light distribution characteristic, thus enhancing illumination quality.

5. Other Modification Example

Although the present disclosure has been described above with reference to some embodiments and modification examples, the present disclosure is not limited to the foregoing embodiments, etc., and may be modified in a variety of ways. For example, the vertex angle of the projections in the optical sheet, the refractive index, and so on as described in the foregoing embodiments are not limited to those described above.

In addition, in the foregoing embodiments, etc., a case where a direction in which the projections T1 in the optical sheet 10 extend and a direction in which the projections T2 in the optical sheet 20 extend substantially coincide with each other, but it is sufficient that a relative angle of these directions is equal to or greater than 0° and less than 45°. Making the direction in which the projections T1 in the optical sheet 10 extend and the direction in which the projections T2 in the optical sheet 20 extend different from each other, that is, making the above-described relative angle in the XY-plane greater than 0° facilitates avoiding occurrence of an interference fringe.

In addition, in the foregoing embodiments, etc., incoming light is refracted by providing the projections T1 in the surface 10S2 of the optical sheet 10 and providing the projections T2 in the surface 20S2 of the optical sheet 20, and so on, but the present disclosure is not limited thereto. For example, a first diffractive lens having a first dot pattern formed in a first region and a second dot pattern formed in a second region may be used as a first transparent optical sheet, and a second diffractive lens having a third dot pattern formed in a third region and a fourth dot pattern formed in a fourth region may be used as a second transparent optical sheet. In other words, as long as an optical effect is produced, the present disclosure is not limited to an optical sheet having physical undulation.

In addition, in the foregoing embodiments, etc., a case where a first vertex angle (vertex angle V1) is equal to or greater than 90° and equal to or smaller than 130° and a second vertex angle (vertex angle V2) is equal to or greater than 90° and equal to or smaller than 95° has been described as an example. However, in the present invention, the first vertex angle and the second vertex angle are not limited thereto. For example, the first vertex angle may be from about 175° to about 160°. Another possible manner of application is setting such a large angle to reduce a degree of light focusing to an insignificant degree without significantly narrowing a half width in an intensity distribution of outgoing light, and enhancing front luminance by about a few percent.

It is to be noted that the effects described in the present specification are mere examples and description thereof is non-limiting. Other effects may be also provided. In addition, the present technology may have the following configurations.

(1) An optical member including:
a first transparent optical sheet extending along a first surface, the first surface being orthogonal to a first axial direction; and
a second transparent optical sheet disposed to be superimposed on the first transparent optical sheet in the first axial direction, the second transparent optical sheet extending along the first surface, the first transparent optical sheet including a structure in which a first region and a second region are alternately disposed in a second axial direction parallel to the first surface, the first region outputting first outgoing light, the first outgoing light being generated by refracting first incoming light to a first direction along the second axial direction, the first incoming light proceeding along the first axial direction, the second region outputting second outgoing light, the second outgoing light being generated by refracting second incoming light to a second direction opposite to the first direction, the second incoming light proceeding along the first axial direction, the second transparent optical sheet including a structure in which a third region and a fourth region are alternately disposed in a third axial direction parallel to the first surface, the third region outputting third outgoing light, the third outgoing light being generated by refracting third incoming light to a third direction along the third axial direction, the third incoming light proceeding along the first axial direction, the fourth region outputting fourth outgoing light, the fourth outgoing light being generated by refracting fourth incoming light to a fourth direction opposite to the third direction, the fourth incoming light proceeding along the first axial direction, an angle formed by the third axial direction with respect to the second axial direction being equal to or greater than 0° and less than 45°.

(2) The optical member according to (1), in which the angle is greater than 0°.

(3) The optical member according to (1) or (2), in which a plurality of the first regions each has a substantially same first width in the second axial direction, a plurality of the second regions each has a substantially same second width in the second axial direction, the plurality of first regions and the plurality of second regions are disposed in the second axial direction at a first pitch, a plurality of the third regions each has a substantially same third width in the second axial direction, a plurality of the fourth regions each has a substantially same fourth width in the second axial direction, and the plurality of third regions and the plurality of fourth regions are disposed in the second axial direction at a second pitch.

(4) The optical member according to any one of (1) to (3), in which the first transparent optical sheet includes a plurality of first projections on a side opposed to the second transparent optical sheet, the plurality of first projections each including a first vertex at which a first inclined surface and a second inclined surface are in contact with each other to form a first vertex angle, the first inclined surface occupying the first region, the second inclined surface occupying the second region, and the second transparent optical sheet includes a plurality of second projections on a side opposite to the first transparent optical sheet, the plurality of second projections each including a second vertex at which a third inclined surface and a fourth inclined surface are in contact with each other to form a second vertex angle, the third inclined surface occupying the third region, the fourth inclined surface occupying the fourth region.

(5) The optical member according to (4), in which the first vertex angle is greater than the second vertex angle.

(6) The optical member according to (4) or (5), in which the first vertex angle is equal to or greater than 90° and equal to or smaller than 130°, and the second vertex angle is equal to or greater than 90° and equal to or smaller than 95°.

(7) The optical member according to any one of (4) to (6), in which the first transparent optical sheet has a first light entry surface on a side opposite to the second transparent optical sheet, and the second transparent optical sheet has a second light entry surface on a side opposed to the first transparent optical sheet.

(8) The optical member according to any one of (1) to (3), in which the first transparent optical sheet includes a first diffractive lens having a first dot pattern and a second dot pattern, the first dot pattern being formed in the first region and the second dot pattern being formed in the second region, and the second transparent optical sheet includes a second diffractive lens having a third dot pattern and a fourth dot pattern, the third dot pattern being formed in the third region and the fourth dot pattern being formed in the fourth region.

(9) A light-emitting device including:

a light source; and an optical member, the optical member including a first transparent optical sheet extending along a first surface, the first surface being orthogonal to a first axial direction, and a second transparent optical sheet disposed to be superimposed on the first transparent optical sheet in the first axial direction, the second transparent optical sheet extending along the first surface, the first transparent optical sheet including a structure in which a first region and a second region are alternately disposed in a second axial direction parallel to the first surface, the first region outputting first outgoing light, the first outgoing light being generated by refracting first incoming light from the light source to a first direction along the second axial direction, the first incoming light proceeding along the first axial direction, the second region outputting second outgoing light, the second outgoing light being generated by refracting second incoming light from the light source to a second direction opposite to the first direction, the second incoming light proceeding along the first axial direction, the second transparent optical sheet including a structure in which a third region and a fourth region are alternately disposed in a third axial direction parallel to the first surface, the third region outputting third outgoing light, the third outgoing light being generated by refracting third incoming light from the light source to a third direction along the third axial direction, the third incoming light proceeding along the first axial direction, the fourth region outputting fourth outgoing light, the fourth outgoing light being generated by refracting fourth incoming light from the light source to a fourth direction opposite to the third direction, the fourth incoming light proceeding along the first axial direction, an angle formed by the third axial direction with respect to the second axial direction being equal to or greater than 0° and less than 45°.

(10) A display including:

a light source;

a first optical member; and a liquid crystal panel, the light source, the first optical member, and the liquid crystal panel being provided in order, the first optical member including a first transparent optical sheet extending along a first surface, the first surface being orthogonal to a first axial direction, and a second transparent optical sheet disposed to be superimposed on the first transparent optical sheet in the first axial direction, the second transparent optical sheet extending along the first surface, the first transparent optical sheet including a structure in which a first region and a second region are alternately disposed in a second axial direction parallel to the first surface, the first region outputting first outgoing light to the liquid crystal panel, the first outgoing light being generated by refracting first incoming light from the light source to a first direction along the second axial direction, the first incoming light proceeding along the first axial direction, the second region outputting second outgoing light to the liquid crystal panel, the second outgoing light being generated by refracting second incoming light from the light source to a second direction opposite to the first direction, the second incoming light proceeding along the first axial direction, the second transparent optical sheet including a structure in which a third region and a fourth region are alternately disposed in a third axial direction parallel to the first surface, the third region outputting third outgoing light to the liquid crystal panel, the third outgoing light being generated by refracting third incoming light from the light source to a third direction along the third axial direction, the third incoming light proceeding along the first axial direction, the fourth region outputting fourth outgoing light to the liquid crystal panel, the fourth outgoing light being generated by refracting fourth incoming light from the light source to a fourth direction opposite to the third direction, the fourth incoming light proceeding along the first axial direction, an angle formed by the third axial direction with respect to the second axial direction being equal to or greater than 0° and less than 45°.

(11) The display according to (10), further including a second optical member on a side opposite to the first optical member as viewed from the liquid crystal panel, in which the second optical member outputs image light to a side opposite to the liquid crystal panel in an output angle range wider than an entry angle range of the image light, the image light incoming from the liquid crystal panel.

(12) An illuminator provided with a light-emitting device that includes a light source and an optical member, the optical member including:

a first transparent optical sheet extending along a first surface, the first surface being orthogonal to a first axial direction; and a second transparent optical sheet disposed to be superimposed on the first transparent optical sheet in the first axial direction, the second transparent optical sheet extending along the first surface, the first transparent optical sheet including a structure in which a first region and a second region are alternately disposed in a second axial direction parallel to the first surface, the first region outputting first outgoing light, the first outgoing light being generated by refracting first incoming light from the light source to a first direction along the second axial direction, the first incoming light proceeding along the first axial direction, the second region outputting second outgoing light, the second outgoing light being generated by refracting second incoming light from the light source to a second direction opposite to the first direction, the second incoming light proceeding along the first axial direction, the second transparent optical sheet including a structure in which a third region and a fourth region are alternately disposed in a third axial direction parallel to the first surface, the third region outputting third outgoing light, the third outgoing light being generated by refracting third incoming light from the light source to a third direction along the third axial direction, the third incoming light proceeding along the first axial direction, the fourth region outputting fourth outgoing light, the fourth outgoing light being generated by refracting fourth incoming light from the light source to a fourth direction opposite to the third direction, the fourth incoming light proceeding along the first axial direction, an angle formed by the third axial direction with respect to the second axial direction being equal to or greater than 0° and less than 45°.

This application claims the benefit of Japanese Priority Patent Application JP2017-108337 filed with the Japan Patent Office on May 31, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An optical member comprising:

a first transparent optical sheet extending along a first surface, the first surface being orthogonal to a first axial direction; and a second transparent optical sheet disposed to be superimposed on the first transparent optical sheet in the first axial direction, the second transparent optical sheet extending along the first surface, the first transparent optical sheet including a structure in which a first region and a second region are alternately disposed in a second axial direction parallel to the first surface, the first region outputting first outgoing light, the first outgoing light being generated by refracting first incoming light to a first direction along the second axial direction, the first incoming light proceeding along the first axial direction, the second region outputting second outgoing light, the second outgoing light being generated by refracting second incoming light to a second direction opposite to the first direction, the second incoming light proceeding along the first axial direction, the second transparent optical sheet including a structure in which a third region and a fourth region are alternately disposed in a third axial direction parallel to the first surface, the third region outputting third outgoing light, the third outgoing light being generated by refracting third incoming light to a third direction along the third axial direction, the third incoming light proceeding along the first axial direction, the fourth region outputting fourth outgoing light, the fourth outgoing light being generated by refracting fourth incoming light to a fourth direction opposite to the third direction, the fourth incoming light proceeding along the first axial direction, an angle formed by the third axial direction with respect to the second axial direction being equal to or greater than 0° and less than 45°, wherein the third outgoing light and the fourth outgoing light include a portion of the light from the first incoming light and the second incoming light, the portion including light that is incident on the first transparent sheet in directions that form angles relative to the first axial direction in a range of approximately −18 degrees to approximately +90 degrees, the −18 degrees being defined by rotating 18 degrees away from the axial direction and toward the second direction, and the +90 degrees being defined by rotating 90 degrees away from the axial direction and toward the first direction.

2. The optical member according to claim 1, wherein the angle is greater than 0°.

3. The optical member according to claim 1, wherein
a plurality of the first regions each has a substantially same first width in the second axial direction,
a plurality of the second regions each has a substantially same second width in the second axial direction,
the plurality of first regions and the plurality of second regions are disposed in the second axial direction at a first pitch,
a plurality of the third regions each has a substantially same third width in the second axial direction,
a plurality of the fourth regions each has a substantially same fourth width in the second axial direction, and
the plurality of third regions and the plurality of fourth regions are disposed in the second axial direction at a second pitch.

4. The optical member according to claim 1, wherein
the first transparent optical sheet includes a plurality of first projections on a side opposed to the second transparent optical sheet, the plurality of first projections each including a first vertex at which a first inclined surface and a second inclined surface are in contact with each other to form a first vertex angle, the first inclined surface occupying the first region, the second inclined surface occupying the second region, and
the second transparent optical sheet includes a plurality of second projections on a side opposite to the first transparent optical sheet, the plurality of second projections each including a second vertex at which a third inclined surface and a fourth inclined surface are in contact with each other to form a second vertex angle, the third inclined surface occupying the third region, the fourth inclined surface occupying the fourth region.

5. The optical member according to claim 4, wherein the first vertex angle is greater than the second vertex angle.

6. The optical member according to claim 4, wherein
the first vertex angle is equal to or greater than 90° and equal to or smaller than 130°, and
the second vertex angle is equal to or greater than 90° and equal to or smaller than 95°.

7. The optical member according to claim 4, wherein
the first transparent optical sheet has a first light entry surface on a side opposite to the second transparent optical sheet, and
the second transparent optical sheet has a second light entry surface on a side opposed to the first transparent optical sheet.

8. The optical member according to claim 1, wherein
the first transparent optical sheet comprises a first diffractive lens having a first dot pattern and a second dot pattern, the first dot pattern being formed in the first region and the second dot pattern being formed in the second region, and
the second transparent optical sheet comprises a second diffractive lens having a third dot pattern and a fourth dot pattern, the third dot pattern being formed in the third region and the fourth dot pattern being formed in the fourth region.

9. A light-emitting device comprising:
a light source; and
an optical member,
the optical member including
a first transparent optical sheet extending along a first surface, the first surface being orthogonal to a first axial direction, and
a second transparent optical sheet disposed to be superimposed on the first transparent optical sheet in the first axial direction, the second transparent optical sheet extending along the first surface,
the first transparent optical sheet including a structure in which a first region and a second region are alternately disposed in a second axial direction parallel to the first surface, the first region outputting first outgoing light, the first outgoing light being generated by refracting first incoming light from the light source to a first direction along the second axial direction, the first incoming light proceeding along the first axial direction, the second region outputting second outgoing light, the second outgoing light being generated by refracting second incoming light from the light source to a second direction opposite to the first direction, the second incoming light proceeding along the first axial direction,
the second transparent optical sheet including a structure in which a third region and a fourth region are alternately disposed in a third axial direction parallel to the first surface, the third region outputting third outgoing light, the third outgoing light being generated by refracting third incoming light from the light source to a third direction along the third axial direction, the third incoming light proceeding along the first axial direction, the fourth region outputting fourth outgoing light, the fourth outgoing light being generated by refracting fourth incoming light from the light source to a fourth direction opposite to the third direction, the fourth incoming light proceeding along the first axial direction,
an angle formed by the third axial direction with respect to the second axial direction being equal to or greater than 0° and less than 45°,
wherein the third outgoing light and the fourth outgoing light include a portion of the light from the first incoming light and the second incoming light, the portion including light that is incident on the first transparent sheet in directions that form angles relative to the first axial direction in a range of approximately −18 degrees to approximately +90 degrees, the −18 degrees being defined by rotating 18 degrees away from the axial direction and toward the second direction, and the +90 degrees being defined by rotating 90 degrees away from the axial direction and toward the first direction.

10. A display comprising:
a light source;
a first optical member; and
a liquid crystal panel,
the light source, the first optical member, and the liquid crystal panel being provided in order,
the first optical member including
a first transparent optical sheet extending along a first surface, the first surface being orthogonal to a first axial direction, and
a second transparent optical sheet disposed to be superimposed on the first transparent optical sheet in the first axial direction, the second transparent optical sheet extending along the first surface, the first transparent optical sheet including a structure in which a first region and a second region are alternately disposed in a second axial direction parallel to the first surface, the first region outputting first outgoing light to the liquid crystal panel, the first outgoing light being generated by refracting first incoming light from the light source to a first direction along the second axial direction, the first incoming light proceeding along the first axial direction, the second region outputting second outgoing light to the liquid crystal panel, the second outgoing light being generated by refracting second incoming light from the light source to a second direction opposite to the first direction, the second incoming light proceeding along the first axial direction, the second transparent optical sheet including a structure in which a third region and a fourth region are alternately disposed in a third axial direction parallel to the first surface, the third region outputting third outgoing light to the liquid crystal panel, the third outgoing light being generated by refracting third incoming light from the light source to a third direction along the third axial direction, the third incoming light proceeding along the first axial direction, the fourth region outputting fourth outgoing light to the liquid crystal panel, the fourth outgoing light being generated by refracting fourth incoming light from the light source to a fourth direction opposite to the third direction, the fourth incoming light proceeding along the first axial direction, an angle formed by the third axial direction with respect to the second axial direction being equal to or greater than 0° and less than 45°, wherein the third outgoing light and the fourth outgoing light include a portion of the light from the first incoming light and the second incoming light, the portion including light that is incident on the first transparent sheet in directions that form angles relative to the first axial direction in a range of approximately −18 degrees to approximately +90 degrees, the −18 degrees being defined by rotating 18 degrees away from the axial direction and toward the second direction, and the +90 degrees being defined by rotating 90 degrees away from the axial direction and toward the first direction.

11. The display according to claim 10, further comprising a second optical member on a side opposite to the first optical member as viewed from the liquid crystal panel, wherein the second optical member outputs image light to a side opposite to the liquid crystal panel in an output angle range wider than an entry angle range of the image light, the image light incoming from the liquid crystal panel.

12. An illuminator provided with a light-emitting device that includes a light source and an optical member, the optical member comprising:

a first transparent optical sheet extending along a first surface, the first surface being orthogonal to a first axial direction; and a second transparent optical sheet disposed to be superimposed on the first transparent optical sheet in the first axial direction, the second transparent optical sheet extending along the first surface, the first transparent optical sheet including a structure in which a first region and a second region are alternately disposed in a second axial direction parallel to the first surface, the first region outputting first outgoing light, the first outgoing light being generated by refracting first incoming light from the light source to a first direction along the second axial direction, the first incoming light proceeding along the first axial direction, the second region outputting second outgoing light, the second outgoing light being generated by refracting second incoming light from the light source to a second direction opposite to the first direction, the second incoming light proceeding along the first axial direction, the second transparent optical sheet including a structure in which a third region and a fourth region are alternately disposed in a third axial direction parallel to the first surface, the third region outputting third outgoing light, the third outgoing light being generated by refracting third incoming light from the light source to a third direction along the third axial direction, the third incoming light proceeding along the first axial direction, the fourth region outputting fourth outgoing light, the fourth outgoing light being generated by refracting fourth incoming light from the light source to a fourth direction opposite to the third direction, the fourth incoming light proceeding along the first axial direction, an angle formed by the third axial direction with respect to the second axial direction being equal to or greater than 0° and less than 45°, wherein the third outgoing light and the fourth outgoing light include a portion of the light from the first incoming light and the second incoming light, the portion including light that is incident on the first transparent sheet in directions that form angles relative to the first axial direction in a range of approximately −18 degrees to approximately +90 degrees, the −18 degrees being defined by rotating 18 degrees away from the axial direction and toward the second direction, and the +90 degrees being defined by rotating 90 degrees away from the axial direction and toward the first direction.

* * * * *